United States Patent [19]
Inoue et al.

[11] Patent Number: 5,896,228
[45] Date of Patent: Apr. 20, 1999

[54] METHOD AND APPARATUS FOR CONTROLLING THE DRIVING OF A BODY

[75] Inventors: Masao Inoue; Yasushi Horiuchi, both of Aichi, Japan

[73] Assignee: Mitsubishi Denki Kabushiki Kaisha, Tokyo, Japan

[21] Appl. No.: 08/542,130

[22] Filed: Oct. 12, 1995

[30] Foreign Application Priority Data

May 1, 1995 [JP] Japan ................... 7-107237

[51] Int. Cl.⁶ .............. G02B 27/64; G02B 26/08; G02B 7/182
[52] U.S. Cl. .............. 359/555; 359/223; 359/871
[58] Field of Search ................ 359/364, 365, 359/430, 223, 555, 556, 871, 872

[56] References Cited

U.S. PATENT DOCUMENTS

| | | |
|---|---|---|
| 4,950,063 | 8/1990 | Pohle et al. ............... 359/430 |
| 5,099,352 | 3/1992 | Yamamoto et al. ............ 359/213 |
| 5,203,220 | 4/1993 | Lerman .................... 74/5.22 |
| 5,210,636 | 5/1993 | Baer ...................... 359/200 |
| 5,276,545 | 1/1994 | Daun et al. ............... 359/198 |
| 5,334,991 | 8/1994 | Wells et al. ............... 345/8 |

OTHER PUBLICATIONS

Yasumasa Yamashita: "Reflecting Telescope" (University of Tokyo Press, 1992).

Primary Examiner—Cassandra C. Spyrou
Assistant Examiner—Mark A. Robinson
Attorney, Agent, or Firm—Sughrue, Mion, Zinn, Macpeak & Seas, PLLC

[57] ABSTRACT

Tilting motion of an auxiliary mirror and a dynamically compensating balancer is separated into a component in which they tiltably move with the same phase and a component in which they tiltably move with opposite phases. As these components are processed by using respective stabilizing filters, the auxiliary mirror and the dynamically compensating balancer are allowed to tiltably move with opposite phases.

15 Claims, 12 Drawing Sheets

METHOD AND APPARATUS FOR CONTROLLING THE DRIVING OF A BODY

BACKGROUND OF THE INVENTION

1. Field of the Invention

The present invention relates to an apparatus and a method for controlling the driving of a body in which, in a case where an object body is moved at a high speed and is stopped at an accurate position as in controlling the tilting motion of an auxiliary mirror in a reflecting telescope, controlling an arm in a high-speed robot, or controlling such as a stepper, i.e., an apparatus for manufacturing a semiconductor, a compensating body is supported by a support so as to eliminate a reaction force occurring in the support for supporting the object body due to the movement of the body, and the object body and the compensating body are made to undergo motion with opposite phases, thereby allowing the reaction force occurring in the support due to the motion of the object body and the reaction force occurring in the support due to the motion of the compensating body to offset each other, so as to prevent an unnecessary force from being imparted to the support.

In particular, a description will be given of an example in which the apparatus and the method for controlling the driving of a body in accordance with the present invention is applied to an apparatus and a method for controlling the driving of an auxiliary mirror wherein in a case where an image observed with a reflecting telescope includes background noise, an auxiliary mirror which receives incident light from a main mirror is inclined at high speed and with high accuracy to a predetermined angle with respect to a reference plane, so as to eliminate or reduce the background noise.

2. Description of the Related Art

When a celestial body is observed by using a reflecting telescope, an image which is observed usually includes background noise due to the effect of the fluctuation of the atmosphere and the like. A spatial chopping method is known as one of the methods for eliminating or reducing such noise.

The spatial chopping method is a method whereby an image which includes the background noise and an image which includes only the background noise are alternately observed, and a difference between the two images is determined, so as to eliminate or reduce the background noise.

Specifically, in order to alternately observe the image which includes the background noise and the image which includes only the background noise, it is necessary to displace the angle of the auxiliary mirror to a predetermined angle.

The basic principle of displacing the angle of the auxiliary mirror is shown in FIGS. 13A and 13B and FIG. 14. In FIGS. 13A and 13B, reference numeral 10 denotes an auxiliary mirror, which is located inside the telescope.

In addition, in FIGS. 13A and 13B, the dotted line denotes a reference plane which serves as a reference at a time when the angle (inclination) of the auxiliary mirror 10 is measured. Normally, the ground, a main mirror (not shown) fixed inside the reflecting telescope, or the like is set as the reference plane. In addition, when the inclination of the auxiliary mirror 10 is parallel with the reference plane, the angle of the auxiliary mirror 10 is 0.

FIG. 13A is a diagram illustrating a state when the angle of the auxiliary mirror 10 is $\theta_1$, while FIG. 13B is a diagram illustrating a state when the angle of the auxiliary mirror 10 is $\theta_2$.

Further, FIG. 14 is a diagram illustrating the characteristic of the angle of displacement of the auxiliary mirror 10 with respect to a change over time.

To alternately observe the image which includes the background noise and the image which includes only the background noise, when the angle of the auxiliary mirror 10 is, for instance, $\theta_1$, after the auxiliary mirror 10 is held at this position for a time duration $T_1$ sufficient for the observation of the image which includes the background noise, the auxiliary mirror 10 is displaced up to an angle $\theta_2$ for a time duration $T_3$. Then, after the auxiliary mirror 10 is held at this position for a time duration $T_2$ sufficient for the observation of the image which includes only the background noise, the auxiliary mirror 10 is displaced up to the angle $\theta_1$ for a time duration $T_4$.

If the image which includes the background noise and the image which includes only the background noise are observed alternately by repeating the above-described operation periodically, and if a difference between the two images is determined, it is possible to eliminate or reduce the background noise which is included during the observation.

As shown in FIG. 14, the change of the angle of displacement of the auxiliary mirror 10 with respect to time exhibits periodicity, and is generally designed such that $\theta_1=-\theta_2$, $T_1=T_2$, and $T_3=T_4$.

Since the position of the celestial body and the fluctuation of the atmosphere change over time, the time required for alternately observing the image which includes the background noise and the image which includes only the background noise should preferably be made as short as possible.

For this reason, the time durations $T_3$ and $T_4$ should preferably be made as short as possible.

In addition, there has been a problem in that the background noise cannot be eliminated unless the auxiliary mirror is held accurately at the position of the angle of displacement $\theta_1$ or $\theta_2$ without vibrating while the images are being observed.

A conventional apparatus for driving an auxiliary mirror devised to overcome the above-described problem is shown in FIG. 15.

FIG. 15 is a cross-sectional view illustrating the structure of a conventional apparatus for driving an auxiliary mirror which is disclosed in U.S. Pat. No. 5,099,352 and was developed for the purpose of tilting and angularly displacing the auxiliary mirror of an optical telescope, though by a very small amount, at high speed and with high accuracy.

In FIG. 15, reference numeral 10 denotes the auxiliary mirror; 11, a dynamically compensating balancer; 50, an actuator for driving the auxiliary mirror 10; 15, a hinge for rotating the auxiliary mirror 10 by a very small amount; 16, a hinge for rotating the dynamically compensating balancer 11 by a very small amount; 12, a mounting base for fixing the auxiliary mirror 10 and the dynamically compensating balancer 11 by means of the hinges 15 and 16; 51, an actuator for driving the dynamically compensating balancer 11; 52, an angle sensor for detecting the angle of the auxiliary mirror 10; and 53, an angle sensor for measuring the angle of the dynamically compensating balancer 11 with respect to the mounting base 12.

Next, a description will be given of the operation.

In a case where the dynamically compensating balancer 11 is not present, when the auxiliary mirror 10 is rotatively driven, the mounting base 12 is swayed in an opposite direction to the rotating direction of the auxiliary mirror 10 owing to its reaction (hereafter, a force occurring in the mounting base 12 due to this reaction will be referred to as a driving reaction force). As a result, the mounting base 12 tilts.

Consequently, the angle between the auxiliary mirror 10 and the mounting base 12 becomes different from that intended by a designer, so that the accuracy of displacement deteriorates.

Accordingly, to avoid the above-described drawback, the dynamically compensating balancer 11 having a shape and mass which are substantially equivalent to those of the auxiliary mirror 10 is conventionally driven with an opposite phase to that of the auxiliary mirror 10, so as to make the mounting base 12 stationary.

That is, the swaying of the mounting base 12 is controlled by designing such that the driving reaction force occurring in the mounting base 12 due to the rotation of the dynamically compensating balancer 11 and the driving reaction force occurring in the mounting base 12 due to the rotation of the auxiliary mirror 10 offset each other.

Specifically, by using servo control or the like capable of providing feedback, the displacement of the rotational angle of the auxiliary mirror 10 is measured by using the angle sensor 52, while the displacement of the rotational angle of the dynamically compensating balancer 11 is measured by using the angle sensor 53. The values measured with the angle sensors 52 and 53 are outputted as signals, and control is provided such that these output signals assume desired values.

FIG. 16 is a block diagram for explaining a method of controlling the above-described apparatus for driving an auxiliary mirror.

In FIG. 16, reference numeral 54 denotes a transfer function which expresses the dynamic characteristic of the auxiliary mirror 10. In the transfer function 54, a torque for driving the auxiliary mirror 10 is used as its input, and the transfer function 54 outputs the angle of the auxiliary mirror 10. Reference numeral 55 denotes a transfer function which expresses the dynamic characteristic of the dynamically compensating balancer 11. In the transfer function 55, a torque for driving the dynamically compensating balancer 11 is used as its input, and the transfer function 55 outputs the angle of the dynamically compensating balancer 11.

Numeral 58 denotes a stabilizing filter for providing control such that the difference between the angle of the auxiliary mirror 10 detected by the angle sensor 52 and an auxiliary-mirror-angle command signal becomes 0. Numeral 56 denotes an actuator driver for calculating the torque to be imparted to the actuator (not shown) for adjusting the angle of the auxiliary mirror 10 on receiving an output from the stabilizing filter 58.

Numeral 59 denotes a stabilizing filter for providing control such that the difference between the angle of the dynamically compensating balancer 11 detected by the angle sensor 53 and a dynamically-compensating-balancer angle command signal becomes 0. Numeral 57 denotes an actuator driver for calculating the torque to be imparted to the actuator (not shown) for adjusting the angle of the dynamically compensating balancer 11 on receiving an output from the stabilizing filter 59.

Next, a description will be given of the operation of the apparatus shown in FIG. 16.

First, an auxiliary-mirror-angle command signal and a dynamically-compensating-balancer angle command signal are given in order to incline the angles of the auxiliary mirror 10 and the dynamically compensating balancer 11.

The auxiliary-mirror-angle command signal is a signal in which the angle to which the designer intends to incline the auxiliary mirror 10 with respect to the reference plane is converted to a signal, while the dynamically-compensating-balancer angle command signal is a signal in which the angle to which the designer intends to incline the dynamically compensating balancer 11 with respect to the reference plane is converted to a signal. These two command signals are periodical, and are signals whose phases are opposite to each other.

In the auxiliary mirror 10, if the auxiliary-mirror-angle command signal is given thereto, the difference between the same and the angle signal of the auxiliary mirror 10 detected by the angle sensor 52 is calculated, and is transmitted to the stabilizing filter 58.

In the stabilizing filter 58, control is effected such that the difference between the angle signal of the auxiliary mirror 10 and the auxiliary-mirror-angle command signal becomes 0, so that a calculation for correcting the inclination of the auxiliary mirror 10 is made, and the result is transmitted to the actuator driver 56.

Upon receiving the result, on the basis of the result the actuator driver 56 calculates the torque for driving the actuator (not shown) for adjusting the angle of the auxiliary mirror 10, so as to drive the actuator (not shown).

Consequently, the angle of the auxiliary mirror 10 changes, so that the angle is detected by the angle sensor 52, and the above-described control is continued until the difference between the angle signal of the auxiliary mirror 10 and the auxiliary-mirror-angle command signal becomes 0 or assumes a value which can be regarded as 0.

Meanwhile, in the dynamically compensating balancer 11, if the dynamically-compensating-balancer angle command signal is given thereto, the difference between the same and the angle signal of the dynamically compensating balancer 11 detected by the angle sensor 53 is calculated, and is transmitted to the stabilizing filter 59.

In the stabilizing filter 59, control is effected such that the difference between the angle signal of the dynamically compensating balancer 11 and the dynamically-compensating-balancer angle command signal becomes 0, so that a calculation for correcting the inclination of the dynamically compensating balancer 11 is made, and the result is transmitted to the actuator driver 57.

Upon receiving the result, on the basis of the result the actuator driver 57 calculates the torque for driving the actuator (not shown) for adjusting the angle of the dynamically compensating balancer 11, so as to drive the actuator (not shown). Consequently, the angle of the dynamically compensating balancer 11 changes, so that the angle is detected by the angle sensor 53, and the above-described control is continued until the difference between the angle signal of the dynamically compensating balancer 11 and the dynamically-compensating-balancer angle command signal becomes 0 or assumes a value which can be regarded as 0.

By adopting the configuration such as the one shown in FIG. 16, angle command signals whose phases are opposite to each other are given to the auxiliary mirror 10 and the dynamically compensating balancer 11. Hence, the auxiliary mirror 10 and the dynamically compensating balancer 11 are tilted with mutually opposite phases. In addition, since the driving reaction force occurring due to the tilting of the auxiliary mirror 10 and the driving reaction force occurring due to the tilting of the dynamically compensating balancer 11 are identical in magnitude, and their directions are opposite, the driving reaction force ceases to occur in the mounting base 12.

5

Next, a description will be given of a method for suppressing the deflection of the auxiliary mirror 10 due to its own weight.

If the auxiliary mirror 10 has a large aperture and a large weight, the auxiliary mirror 10 deflects due to its own weight. The manner in which it deflects depends on the inclination of the auxiliary mirror 10.

If the auxiliary mirror 10 has a particularly large aperture and a very large weight, it is necessary to suppress the deflection of the auxiliary mirror 10 due to its own weight.

FIGS. 17A and 17B are cross-sectional views illustrating a mechanism for supporting the auxiliary mirror 10 provided for suppressing the deflection due to the gravity in a conventional auxiliary mirror, as shown in, for instance, Yasumasa Yamashita: "Reflecting Telescope" (University of Tokyo Press, 1992).

Specifically, the auxiliary mirror 10 is segmented into a plurality of blocks, and the weight of each of the blocks themselves is further separated into a component parallel to the auxiliary mirror 10 (a component perpendicular to the optical axis of the auxiliary mirror 10) and a component perpendicular to the auxiliary mirror 10 (a component parallel to the optical axis of auxiliary mirror 10). A supporting mechanism for suppressing the positional deviation due to the weight of the auxiliary mirror 10 itself is provided for each component.

FIG. 17A is a cross-sectional view illustrating the operation in the direction of the optical axis of the auxiliary mirror 10 (the direction perpendicular to the auxiliary mirror 10), and FIG. 17B is a cross-sectional view illustrating the operation in a direction perpendicular to the optical axis (the direction parallel to the auxiliary mirror 10).

In FIGS. 17A and 17B, reference numeral 10 denotes the auxiliary mirror; 12 denotes the mounting base for fixing the auxiliary mirror 10; 31 and 32 denote link mechanisms for supporting the load of the auxiliary mirror 10 in the direction of its optical axis; 33 denotes a counter weight for canceling a component, acting in the direction of the optical axis, of the weight of the auxiliary mirror 10 itself; 34 denotes a fulcrum of the link mechanism 31; 41 and 42 denote link mechanisms for supporting the load of the auxiliary mirror 10 in the direction perpendicular to its optical axis; 43 denotes a counter weight for canceling a component, acting in the direction perpendicular to the optical axis, of the weight of the auxiliary mirror 10 itself; and 44 denotes a fulcrum of the link mechanism 41.

Next, a description will be given of the operation. In a telescope having a large mirror surface, since the weight of the mirror itself is large, the deformation due to its own weight cannot be ignored. To reduce the deformation due to its own weight, the weight must be supported by being distributed at a multiplicity of supporting points, and a function must be provided whereby its supporting force changes in correspondence with the elevation angle of the telescope.

If it is assumed that the weight of the block itself is W, and the weight of the counter weight 43 itself is Wc when the auxiliary mirror 10 is segmented into a plurality of blocks, FIG. 17A shows that when the elevation angle of the auxiliary mirror 10 is θ, its component in the optical-axis direction is Wsinθ, and that the optical-axis component of the force generated by the counter weight 33 and amplified by the link mechanisms 31 and 32 is $Wc(s_2/s_1)\sin\theta$.

It should be noted that $s_1$ is the distance from the fulcrum 34 of the link mechanism 31 to the point of application, and $s_2$ is the distance from the fulcrum 34 to the center of gravity of the counter weight 33.

6

Consequently, if the dimensions of the link mechanisms and the mass of the counter weight 33 are selected such that the formula $W=Wc(s_2/s_1)$ is satisfied, it becomes possible to offset the optical-axis-direction component of the weight of the auxiliary mirror itself irrespective of the elevation angle of the telescope. Hence, it becomes possible to suppress the deflection of the auxiliary mirror 10 in the optical-axis direction due to its own weight.

FIG. 17B shows that the component, perpendicular to the optical axis, of the auxiliary mirror 10 is Wcosθ, and that the component, perpendicular to the optical axis, of the force generated by the counter weight 43 by means of the link mechanisms 41 and 42 is $Wc(s_2/s_1)\cos\theta$.

It should be noted, however, that $s_1$ is the distance from the fulcrum 44 of the link mechanism 41 to the point of application, and $s_2$ is the distance from the fulcrum 44 to the center of gravity of the counter weight 43.

Consequently, for exactly the same reason as that for the optical-axis direction, if the dimensions of the link mechanisms and the mass of the counter weight 43 are selected such that the formula $W=Wc(s_2/s_1)$ is satisfied, it becomes possible to offset the component, perpendicular to the optical axis, of the weight of the auxiliary mirror itself irrespective of the elevation angle of the telescope. Thus, by disposing a multiplicity of mechanisms, such as those shown in FIGS. 17A and 17B, on the auxiliary mirror, it is possible to automatically vary the supporting force without causing the supporting force to be concentrated on a particular point of application and irrespective of the elevation angle of the telescope.

With the above-described apparatus, the vibration of the mounting base 12 becomes a problem. If the mounting base 12 vibrates, it becomes difficult to accurately determine the inclination of the auxiliary mirror 10 and the dynamically compensating balancer 11, and the transition time is prolonged.

In the event that a time lag has occurred between the torques generated by the actuators (not shown) for tilting the auxiliary mirror 10 and the dynamically compensating balancer 11 by imparting torques thereto, the driving reaction force occurring in the mounting base 12 by tilting the auxiliary mirror 10 and the driving reaction force occurring in the mounting base 12 by tilting the dynamically compensating balancer 11 cease to offset each other, possibly swaying the mounting base 12.

In addition, if the angle sensors are installed on the mounting base 12, it means that the detected angle of the auxiliary mirror 10 is the one which is detected from the mounting base, and the auxiliary mirror 10 is controlled in such a manner as to tilt the auxiliary mirror 10 to a designated angle from the mounting base 12.

At this time, the design is made so that the mounting base and the reference plane are located in parallel.

The angle at which the auxiliary mirror 10 is tilted must be controlled in such a way as to be tilted to a designated angle from the reference plane. Therefore, if the inclination of the mounting base and the inclination of the reference plane differ from each other, there is a problem in that the angle cannot be detected adequately when the angle of the auxiliary mirror from the reference plane is detected from the mounting base.

The aforementioned problem will be described with reference to FIG. 18.

FIG. 18 is an explanatory diagram illustrating the fact that it becomes impossible to control the angle of the auxiliary mirror due to the swaying of the mounting base in a conventional apparatus for controlling the driving of an auxiliary mirror.

In FIG. 18, reference numeral 10 denotes the auxiliary mirror; 11, the dynamically compensating balancer; and 12, the mounting base. The mounting base 12 is disposed in such a manner that the angle of the auxiliary mirror 10 with respect to the mounting base 12 and the angle of the auxiliary mirror 10 with respect to the reference plane are identical.

Reference numeral 13 denotes a supporting structure for supporting the mounting base 12 at the reference plane. Since the supporting structure 13 does not completely fix the mounting base at the reference plane, the mounting base 12 sways in correspondence with the rigidity of the supporting structure 13 if the difference between the driving reaction force occurring in the mounting base 12 due to the tilting of the auxiliary mirror 10 and the driving reaction force occurring in the mounting base 12 due to the tilting of the dynamically compensating balancer 11 becomes excessively large.

As shown in FIG. 18, the motion of the auxiliary mirror 10 and the motion of the dynamically compensating balancer 11 are not completely independent, and have a characteristic that they interfere with each other via the supporting structure which supports them. Although the effect is small in the case of a relatively small-size apparatus for controlling the driving of an auxiliary mirror, the rigidity of the supporting structure relatively declines in the case of a large-size auxiliary mirror, so that the motion of the auxiliary mirror and the dynamically compensating balancer induces the motion of the supporting structure. As a result, the effect of the motion of the two members on changes of their respective angles becomes large.

Reference numeral 52 denotes the angle sensor for detecting the angle of the auxiliary mirror 10, and numeral 53 denotes the angle sensor for detecting the angle of the dynamically compensating balancer 11, the angle sensors 52 and 53 being mounted on the mounting base 12.

In FIG. 18, the mounting base 12 is not completely fixed, and is installed on the ground or the like by means of the supporting structure 13 which has finite rigidity.

In the spatial chopping method, since the auxiliary mirror 10 receives light from the main mirror (not shown) fixed in the reflecting telescope, if the inclination of the main mirror (not shown) is set as the reference plane, it is necessary to adequately control the relative angle between the main mirror (not shown) and the auxiliary mirror.

For this reason, the relative angle between the main mirror (not shown) and the auxiliary mirror 10 is controlled by installing the mounting base 12 in parallel with the inclination of the main mirror (not shown) and by providing the angle sensors on the mounting base 12.

Here, it should be noted that since the angle sensors are provided on the mounting base 12, the angle of displacement between the auxiliary mirror 10 and the dynamically compensating balancer 11 is one which is measured not from the reference plane but from the mounting base 12.

It is assumed that the mounting base 12 is stationary with respect to the reference plane, and that only the actuator (not shown) for adjusting the inclination of the auxiliary mirror 10 is generating torque at this time, thereby rotating the auxiliary mirror 10 clockwise.

The mounting base 12 rotates counterclockwise due to the driving reaction force occurring due to the rotation of the auxiliary mirror 10.

Consequently, the conventional controlling apparatus, which is based on the assumption that the mounting base 12 does not become offset from the reference plane, judges that such a relative displacement has occurred that the dynamically compensating balancer 11 has undergone clockwise rotation, as it were.

Since the control system for controlling the angle of the auxiliary mirror 10 and the angle of the dynamically compensating balancer 11 is configured as shown in FIG. 18, by rotating the dynamically compensating balancer 11 counterclockwise the conventional control system operates in such a manner as to cause the angle of the dynamically compensating balancer to approach the angle designated by the dynamically-compensating-balancer angle command signal.

This force for rotating the dynamically compensating balancer 11 counterclockwise now constitutes a driving reaction force for rotating the mounting base 12 clockwise, so that the control system operates in such a manner as to allow that force to assume a value which designates a relative displacement by rotating the auxiliary mirror 10 clockwise.

In other words, as the mounting base 12 vibrates, if an attempt is made to control either one of the auxiliary mirror 10 or the dynamically compensating balancer 11, an influence is exerted on the other, so that the tilting of the auxiliary mirror 10 and that of the dynamically compensating balancer 11 interfere with each other.

Thus, with the conventional control system, despite the fact that the motion of the auxiliary mirror 10 and that of the dynamically compensating balancer 11 interfere with each other, the control of their angles is respectively provided independently. Hence, there has been a problem in that the vibration of the mounting base 12 cannot be suppressed due to the above-described phenomenon in the case where the mounting base 12 vibrates.

Additionally, since it becomes impossible to maintain the relationship of parallelism between the mounting base 12 and the reference plane due to the swaying of the mounting base 12, there has been a problem in that the reliability of output values of the angle sensors declines, and that the transition time is prolonged.

In addition, the conventional method of supporting an auxiliary mirror of a reflecting telescope makes it possible to provide satisfactory performance in the case of a telescope in which the auxiliary mirror 10 is used by being fixed.

However, with the telescope of the type in which the auxiliary mirror 10 is repeatedly tilted at high speed, wideband servo control for controlling the displacement of the tilting angle of the auxiliary mirror is indispensable. For that reason, the structure for supporting the auxiliary mirror 10 which is driven must be made rigid.

If the structure for supporting the auxiliary mirror 10 is arranged to be rigid, an excessively large driving force is required for driving the auxiliary mirror 10. Consequently, with the supporting mechanism which is comprised of a multiplicity of small component parts, as shown in FIGS. 17A and 17B, the link mechanisms each provided with a counter weight vibrate, so that there has been a problem in that the servo control system causes resonance in the supporting mechanisms.

In addition, in a case where the auxiliary mirror 10 is inclined to a predetermined angle, sensors are required which are capable of accurately measuring a region in the vicinity of the predetermined angle.

If it is assumed that the angles between which the auxiliary mirror 10 is tiltably moved are $\theta_1$ and $\theta_2$ (where $\theta_1 > \theta_2$), the range of measurement by the measuring means should preferably be greater than $\theta_1$ and smaller than $\theta_2$.

In other words, requirements of the sensor for measuring the angle are that the measurement range should be wider than the angular range in which the auxiliary mirror 10 is tiltably moved, and that the detection accuracy in the vicinity of the angle at which the auxiliary mirror 10 is held should be high.

However, a wide extent of the measurement range and a high level of detection accuracy are generally in a reciprocal relationship.

That is, the measurement range and the detection accuracy are in such a relationship that if the measurement range is made wide, the detection accuracy declines, whereas if the detection accuracy is made high, the measurement range becomes narrow.

In addition, even if a multiplicity of sensors respectively having narrow but different detection ranges and high detection accuracy are arranged to detect a wide range, it becomes necessary to correct the positional deviation of heads (not shown) of the multiplicity of sensors. Further, the number of lines or wires of the wiring for transmitting the signals outputted from the individual sensors increases substantially.

Moreover, in a case where the direction of the drive rotation axis of the auxiliary mirror 10 is arbitrarily changeable, the auxiliary mirror 10 can be tilted in various directions.

In this case, as the direction of the rotation axis changes, the distance from the drive rotation axis of the auxiliary mirror 10 to the angle sensor changes. Hence, if the direction of the rotation axis changes, both its detection range and a region which is to be detected with high accuracy also change simultaneously even in the case of the same angle sensor.

Accordingly, the region of angles for which high detection accuracy is required also changes, so that it is not effective to install an angle sensor having high detection accuracy by being offset in advance from a neutral position.

Namely, with the conventional angle sensors for detecting the angle of the auxiliary mirror 10, only either an angle sensor having high detection accuracy or an angle sensor having a wide measurement range is used, so that there has been a drawback in that either the high level of detection accuracy or the wide extent of the measurement range must be sacrificed.

SUMMARY OF THE INVENTION

The present invention is intended to solve the above-described problems.

According to a first aspect of the invention, there is provided an apparatus for controlling the driving of a body, comprising:

a first body that undergoes motion about a center of gravity thereof;

a second body that undergoes motion about a center of gravity thereof;

a support for supporting the first and second bodies;

a first detecting device for detecting a first relative displacement between the support and the first body;

a first actuator for adjusting the first displacement;

a second detecting device for detecting a second relative displacement between the support and the second body;

a second actuator for adjusting the second displacement; and a drive controlling device for separating, based on the first displacement and the second displacement, motion of the first and second bodies into a component in which the first and second bodies move with the same phase and a component in which the first and second bodies move with opposite phases, and for controlling the first and second actuators so that the same-phase component and the opposite-phase component satisfy a predetermined relationship, so as to allow the first and second bodies to move with opposite phases.

According to a second aspect of the invention, there is provided an apparatus for controlling the driving of a body, comprising:

a first body that undergoes motion about a center of gravity thereof;

a second body that undergoes motion about a center of gravity thereof;

a support for supporting the first and second bodies;

a first detecting device for detecting a first relative displacement between the support and the first body;

a first actuator for adjusting the first displacement;

a second detecting device for detecting a second relative displacement between the support and the second body;

a second actuator for adjusting the second displacement; and a drive controlling device for separating, based on the first displacement and the second displacement, motion of the first and second bodies into a component in which the first and second bodies move with the same phase and a component in which the first and second bodies move with opposite phases, and for controlling the first and second actuators so that the same-phase component and the opposite-phase component satisfy a predetermined relationship, so as to make the support stationary.

According to a third aspect of the invention, there is provided an apparatus for controlling the driving of a body, comprising:

a detecting device for detecting a position of a center of gravity of the body;

a filter for detecting a frequency of vibration of the center of gravity of the body;

an actuator for controlling the vibration of the center of gravity of the body; and driving means for driving the actuator in accordance with the detected vibration frequency, so as to make the center of gravity of the body stationary.

With this constitution, it becomes possible to prevent the vibration of the first body.

In the above constitution, the first body, the second body, and the support may be an auxiliary mirror, a dynamically compensating balancer, and a mounting base of a reflecting telescope, respectively.

The first detecting device may detect a relative angle between the mounting base and the auxiliary mirror. In this case, it becomes possible to calculate the inclination of the auxiliary mirror with respect to the mounting base.

The first detecting device may have at least three sensors arranged so as not to be located on a straight line, each for detecting a relative distance between the mounting base and the auxiliary mirror, calculate a plane to which the auxiliary mirror belongs based on the detected relative distances, and detect the relative angle between the mounting base and the auxiliary mirror based on the calculated plane.

The second detecting device may detect a relative angle between the mounting base and the dynamically compensating balancer. In this case, it becomes possible to calculate the inclination of the dynamically compensating balancer with respect to the mounting base.

The second detecting device may have at least three sensors arranged so as not to be located on a straight line, each for detecting a relative distance between the mounting base and the dynamically compensating balancer, calculate a plane to which the dynamically compensating balancer belongs based on the detected relative distances, and detect the relative angle between the mounting base and the dynamically compensating balancer based on the calculated plane.

Each of the sensors may be a capacitive sensor. In this case, it becomes possible to convert the distance between the first body and the support or the distance between the second body and the support into a changes in capacitance.

An output of the first and/or second detecting device may include a first detection value in which a detection angle range is wide and detection accuracy is low and a second detection value in which the detection angle range is narrow and detection accuracy is high. In this case, when a designer desires to detect the angle accurately, control may be effected by using the second detection value in which the detection accuracy is high.

The detecting device may output one of a first detected value in which a range of a detection angle is wide and detection accuracy is low and a second detection value in which the detection angle range is narrow and detection accuracy is high, and an identification signal indicating which of the first detection value and the second detection value is output. In this case, it becomes possible to reduce the wiring or the number of lines connecting the detecting device and the drive controlling device.

The apparatus may further comprise a supporting mechanism which includes first supporting means for supporting the auxiliary mirror so as to cancel a first component of its own weight which is parallel with the auxiliary mirror, and second supporting means for supporting the auxiliary mirror so as to cancel a second component of the weight which is perpendicular to the auxiliary mirror, whereby a positional deviation of the auxiliary mirror due to its own weight is suppressed. In this case, it becomes possible to prevent the positional deviation of the auxiliary mirror due to a change in the inclination of the auxiliary mirror.

The second supporting means may be a pneumatic actuator for supporting the auxiliary mirror by using pressure of a gas.

The actuator may include a pneumatic actuator for controlling the position of the center of gravity of the body by changing pressure of a gas, and a magnetic attraction actuator for controlling the position of the center of gravity of the auxiliary mirror by changing intensity of a magnetic field, and the driving means may drive the pneumatic actuator and the magnetic attraction actuator in accordance with the detected vibration frequency of the center of gravity of the body.

Further, according to the first aspect of the invention mentioned above, there is provided a method for controlling the driving of a body, comprising the steps of:

detecting a first relative displacement between a support and a first body and a second relative displacement between the support and a second body;

separating motion of the first and second bodies into a component in which the first and second bodies move with the same phase and a component in which the first and second bodies move with opposite phases; and controlling the motion of the first and second bodies so that the same-phase component and the opposite-phase component satisfy a predetermined relationship, so as to allow the first and second bodies to be move with opposite phases.

According to the second aspect of the invention, there is provided a method for controlling the driving of a body, comprising the steps of:

detecting a first relative displacement between a support and a first body and a second relative displacement between the support and a second body;

separating motion of the first and second bodies into a component in which the first and second bodies are move with the same phase and a component in which the first and second bodies move with opposite phases; and controlling the motion of the first and second bodies so that the same-phase component and the opposite-phase component satisfy a predetermined relationship, so as to make the support stationary.

According to the third aspect of the invention, there is provided a method for controlling the driving of a body, comprising the steps of:

detecting a position of a center of gravity of the body;

detecting a frequency of vibration a center of gravity of the body based on the detected position; and controlling the vibration of the center of gravity of the body in accordance with the detected vibration frequency, so as to make the center of gravity of the body stationary.

DESCRIPTION OF THE PREFERRED EMBODIMENTS

First Embodiment

Figure 1:
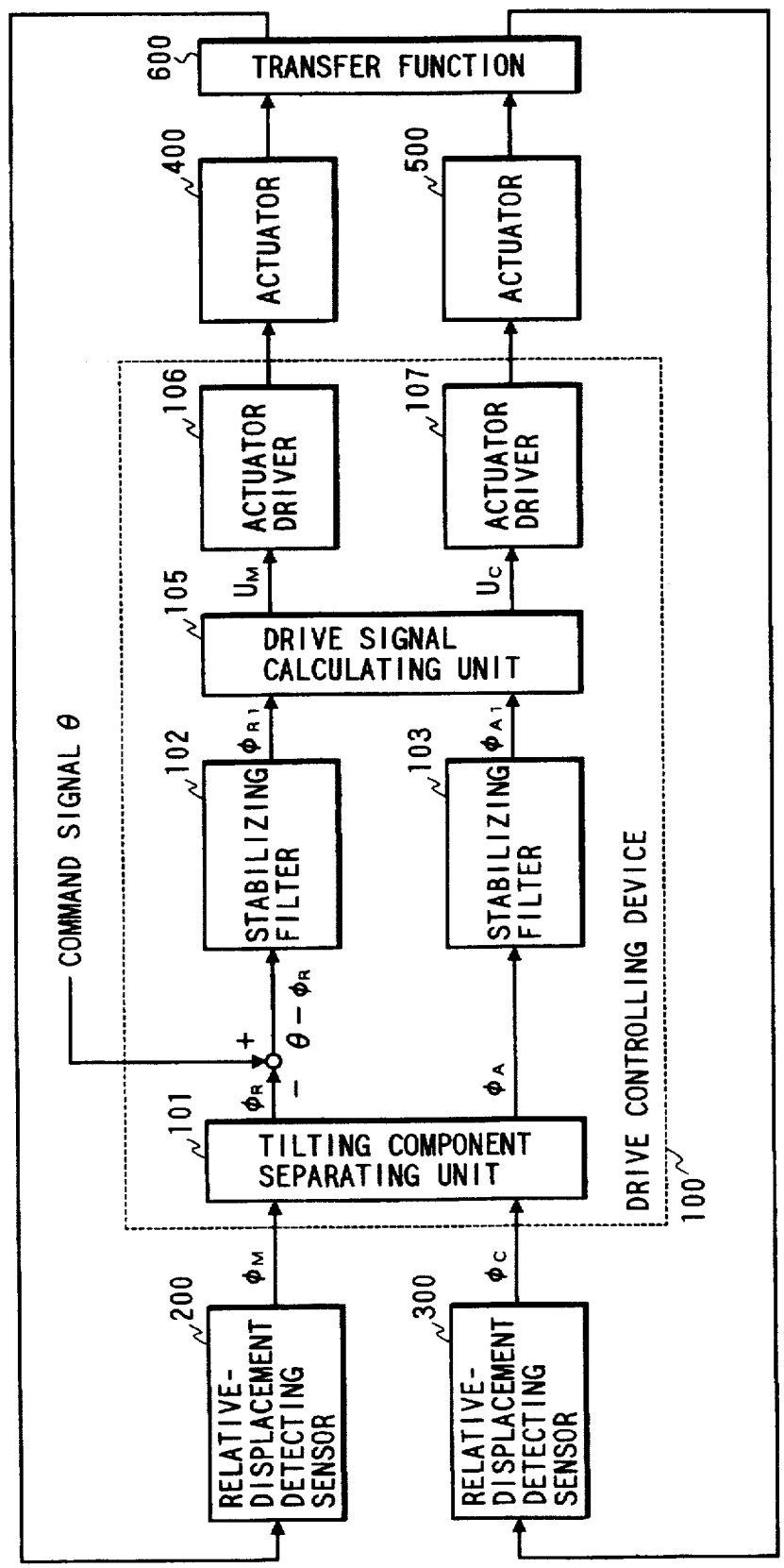
FIG. 1 is a block diagram of an apparatus for controlling the driving of a body according to a first embodiment of the present invention.

FIG. 1 shows a block diagram of an apparatus for controlling the driving of an auxiliary mirror according to this embodiment.

The apparatus for controlling the driving of an auxiliary mirror in accordance with the present invention is characterized by comprising a drive-controlling device for examining an angle between an auxiliary mirror 10 and a mounting base 12 and an angle between a dynamically compensating balancer 11 and the mounting base 12 at each predetermined timing, and for adjusting the angle between the auxiliary mirror 10 and the mounting base 12 and the angle between the dynamically compensating balancer 11 and the mounting base 12 such that a predetermined relationship between these two angles is satisfied, thereby tilting the auxiliary mirror 10 and the dynamically compensating balancer 11 with opposite phases and suppressing the swaying of the mounting base 12.

In FIG. 1, reference numeral 200 denotes a relative-displacement detecting device for detecting an angle $\phi_M$ between the auxiliary mirror 10 and the mounting base 12 at each predetermined timing.

Numeral 300 denotes a relative-displacement detecting device for detecting an angle $\phi_C$ between the dynamically compensating balancer 11 and the mounting base 12 at each predetermined timing.

Numeral 400 denotes an actuator for adjusting an angle between the auxiliary mirror 10 and the mounting base 12, and numeral 500 denotes an actuator for adjusting an angle between the dynamically compensating balancer 11 and the mounting base 12.

Numeral 100 denotes a drive controlling device to which are inputted the signal values $\phi_M$ and $\phi_C$ detected by the relative-displacement detecting devices 200 and 300, and which causes a predetermined relationship between these two signal values to be satisfied, whereby the drive controlling device 100 has a function for adjusting the angle between the auxiliary mirror 10 and the mounting base 12 and the angle between the dynamically compensating balancer 11 and the mounting base 12.

The drive controlling device 100 consists of the following: a tilting-component separating unit 101 to which $\phi_M$ and $\phi_C$ are inputted, and which separates the inputted signals into a component $\phi_A$ for tiltably moving the auxiliary mirror 10 and the dynamically compensating balancer 11 with the same phases and a component $\phi_R$ for tiltably moving the auxiliary mirror 10 and the dynamically compensating balancer 11 with opposite phases, and outputs the same; a stabilizing filter 102 for providing control such that the difference between the angle θ at which the auxiliary mirror 10 is intended by the designer to be held and $\phi_R$, i.e., θ−$\phi_R$, becomes 0 through PID control or the like; a stabilizing filter 103 for providing control such that $\phi_A$ becomes 0 through PID control; a drive-signal calculating unit 105 to which are inputted an output signal $\phi_{R1}$ from the stabilizing filter 102 and an output signal $\phi_{A1}$ from the stabilizing filter 103, and which calculates and outputs drive command signals $U_M$ and $U_C$ for driving the actuators 400 and 500 to adjust the inclination of the auxiliary mirror 10 and the dynamically compensating balancer 11; an actuator driver 106 to which $U_M$ is inputted, and which calculates and outputs a torque for driving the actuator 400; and an actuator driver 107 to which $U_C$ is inputted, and which calculates and outputs a torque for driving the actuator 500.

Numeral 600 denotes a transfer function expressing the dynamic characteristics of both of the auxiliary mirror 10 and the dynamically compensating balancer 41. In this embodiment, the transfer function 600 is expressed by such a function that the torques of the actuators 400 and 500 are used as inputs therefor, and it outputs a relative displacement between the auxiliary mirror 10 and the mounting base 12 and a relative displacement between the dynamically compensating balancer 11 and the mounting base 12.

Here, if internal variables of the stabilizing filters 102 and 103 are adequately designed, it is also possible to adjust the time and response speed required for tilting the auxiliary mirror 10 and the dynamically compensating balancer 11 to targeted values, i.e., for tilting the auxiliary mirror 10 to an angle intended by the designer.

In addition, since the gain (the gain-bandwidth product or GB product) of the stabilizing filter 102 is set to be large, while the gain (the gain-bandwidth product or GB product) of the stabilizing filter 103 is set to be small, it is possible to suppress the resonance ascribable to a component in which the auxiliary mirror 10 and the dynamically compensating balancer 11 are tiltably moved with the same phases, and the response to a component for tiltable movement with opposite phases can be speeded up as compared to that for the same phases. Hence, it is possible to tilt the auxiliary mirror 10 and the dynamically compensating balancer 11 with opposite phases.

Next, a description will be given of the operation of the apparatus shown in FIG. 1.

First, the angle $\phi_M$ between the auxiliary mirror 10 and the mounting base 12 is calculated by the relative-displacement detecting device 200, and the angle $\phi_C$ between the dynamically compensating balancer 11 and the mounting base 12 is calculated by the relative-displacement detecting device 300.

As for the tilting motion of the auxiliary mirror 10 and the dynamically compensating balancer 11, the component $\phi_A$ with which these two members are tilted with the same phases and the component $\phi_R$ with which they are tilted with opposite phases are calculated by the following Formulae (1) and (2):

$$\phi_A = (\phi_M + \sigma\phi_C)/2 \tag{1}$$

$$\phi_R = (\phi_M - \sigma\phi_C)/2 \tag{2}$$

$$\sigma = I_C/I_M \tag{3}$$

where $I_M$: moment of inertia of the auxiliary mirror 10

$I_C$: moment of inertia of the dynamically compensating balancer 11

Here, σ represents a ratio between the moment of inertia, $I_M$, of the auxiliary mirror 10 and the moment of inertial, $I_C$, of the dynamically compensating balancer 11.

In particular, in a case where σ=1, Formula (1) expresses an average of $\phi_M$ and $\phi_C$, and Formula (2) expresses half a value of the angle of relative displacement between the auxiliary mirror 10 and the dynamically compensating balancer 11.

Figure 2A:
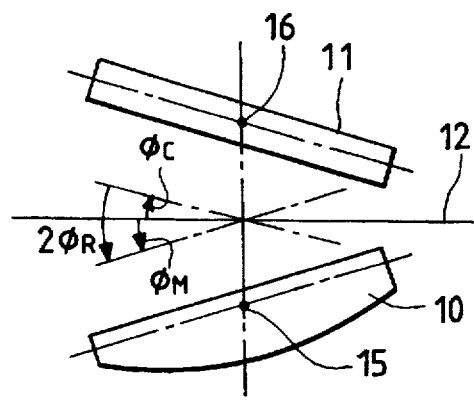
FIGS. 2A and 2B respectively illustrate a component of tilting motion of an auxiliary mirror and a dynamically compensating balancer in which they move with opposite phases and a component in which they move with the same phase.
Figure 2B:
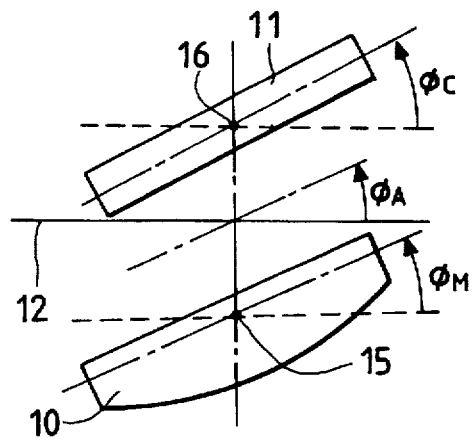

Here, the component in which the auxiliary mirror 10 and the dynamically compensating balancer 11 are tilted with the same phases and the component in which they are tilted with opposite phases are shown in FIGS. 2A and 2B. As shown in FIGS. 2A and 2B, the component in which the auxiliary mirror 10 and the dynamically compensating balancer 11 are tilted with the same phase is the component in which the auxiliary mirror 10 and the dynamically compensating balancer 11 are tilted in the same direction, while the component in which the auxiliary mirror 10 and the dynamically compensating balancer 11 are tilted with opposite phases is the component in which the auxiliary mirror 10 and the dynamically compensating balancer 11 are tilted in the opposite directions. Numerals 15 and 16 denote the center of gravity of the auxiliary mirror 10 and that of the dynamically compensating balancer 11, respectively.

The tilting motion of the auxiliary mirror 10 and the dynamically compensating balancer 11 can be separated into the component in which they are tilted with the same phases and the component in which they are tilted with opposite phases. If the tilting motion of the two members includes only the component in which they are tilted with opposite phases, the mounting base 12 does not vibrate. However, if the component in which they are tilted with the same phases is present, the mounting base 12 vibrates.

In this embodiment, the vibration of the mounting base 12 is suppressed by eliminating the component for tilting with the same phases, by making the component for tilting with the same phases sufficiently smaller than the component for tilting with opposite phases.

Next, $\phi_A$ calculated in accordance with Formula (1) is transmitted to the stabilizing filter 103, and the difference, $\theta - \phi_R$, between $\phi_R$ calculated in accordance with Formula (2) and the angle $\theta$ at which the auxiliary mirror 10 is intended by the designer to be held is transmitted to the stabilizing filter 102.

The stabilizing filter 102 effects control such that the difference $\theta - \phi_R$ is reduced to 0, and an output $\phi_R$ at this time is transmitted to the drive-signal calculating unit 105.

The stabilizing filter 103 effects control such that $\phi_A$ is reduced to 0, and an output $\phi_{A1}$ at this time is transmitted to the drive-signal calculating unit 105.

Upon receiving $\phi_{R1}$ and $\phi_{A1}$, the drive-signal calculating unit 105 calculates the signals $U_M$ and $U_C$ for driving the actuators 400 and 500 in accordance with the following Formulae (4) and (5):

$$U_M = \phi_{R1} + \phi_{A1} \tag{4}$$

$$U_C = \phi_{R1} - \phi_{A1} \tag{5}$$

$U_M$ denotes a drive command signal to the actuator 400 for correcting $\phi_M$ detected by the relative-displacement detecting device 200, and $U_C$ denotes a drive command signal to the actuator 500 for correcting $\phi_C$ detected by the relative-displacement detecting device 300. As the actuators 400 and 500 are driven on the basis of these drive command signals, control is effected such that $\phi_A = 0$ at each predetermined timing.

Accordingly, by effecting control such that $\phi_A = 0$, the auxiliary mirror 10 and the dynamically compensating balancer 11 are tilted with opposite phases. Consequently, since the swaying of the mounting base 12 does not occur, the mounting base 12 becomes stationary with respect to the reference plane (not shown).

In addition, when $\phi_A = 0$, $\phi_R = \phi_M$ from Formulae (1) and (2), so that the control by the stabilizing filter 102 for effecting control such that the difference $\theta - \phi_R$ is reduced to 0 means that control is effected such that $\theta - \phi_M$ is reduced to 0.

When $\phi_A = 0$, and $\theta - \phi_M = 0$, the swaying of the mounting base 12 does not occur, so that the mounting base 12 becomes stationary with reference to the reference plane (not shown), and the auxiliary mirror 10 is inclined at the angle $\theta$ intended by the designer.

When the tilting motion has come to include only the component in which the auxiliary mirror 10 and the dynamically compensating balancer 11 are tilted with opposite phases through the above-described control, $\phi = 0$ from Formulae (1) and (2), so that $$\phi_M = -\sigma \phi_C \tag{6}$$

In particular, when $\sigma = 1$, $$\phi_M = -\phi_C \tag{7}$$

Thus, in a state in which $\phi^A = 0$, Formula (7) means that the auxiliary mirror 10 and the dynamically compensating balancer 11 have the same magnitudes of the angle of displacement and are tilted with opposite phases at each timing.

That is, when the relationship of Formula (6) is satisfied, the auxiliary mirror 10 and the dynamically compensating balancer 11 cease to be tilted with the same phases, with the result that the mounting base 12 ceases to sway. In the state in which the mounting base 12 has ceased to sway, $\phi_R$ and $\phi_M$ become equal, so that the following formula holds:

$$\phi_R = \phi_M \tag{8}$$

Accordingly, in the state in which $\phi_A = 0$, the stabilizing filter 102 for effecting control such that the difference $\theta - \phi_R$ becomes 0 effects control such that the difference $\theta - \phi_M$ becomes 0. As a result, the auxiliary mirror 10 and the dynamically compensating balancer 11 can be tilted with opposite phases, and the auxiliary mirror 10 can be inclined and held at an angle at which the auxiliary mirror 10 is to be held.

Next, $U_M$ calculated by the drive-signal calculating unit 105 is transmitted to the actuator driver 106, and $U_C$ calculated by the drive-signal calculating unit 105 is transmitted to the actuator driver 107.

Upon receiving $U_M$, the actuator driver 106 calculates the torque for driving the actuator 400 on the basis of this value, and drives the actuator 400.

Similarly, upon receiving $U_C$, the actuator driver 107 calculates the torque for driving the actuator 500 on the basis of this value, and drives the actuator 500.

As the torque is applied to the actuators 400 and 500, the output of the transfer function 600 changes, so that $\phi_M$ and $\phi_C$ are detected by the relative-displacement detecting devices 200 and 300, and similar control is carried out thereafter.

Thus, at each predetermined timing, the value of the angle $\phi_M$ between the auxiliary mirror 10 and the mounting base 12 and the value of the angle $\phi_C$ between the dynamically compensating balancer 11 and the mounting base 12 are detected, the tilting motion of the auxiliary mirror 10 and the dynamically compensating balancer 11 is separated into the component in which the auxiliary mirror 10 and the dynamically compensating balancer 11 are tilted with the same phases and the component in which they are tilted with opposite phases, and the component for tilting with the same phases is reduced and the component for tilting with opposite phases is amplified by the stabilizing filters. Accordingly, the auxiliary mirror 10 and the dynamically compensating balancer 11 can be tilted with opposite phases so as to suppress the resonance ascribable to the component for tilting with the same phases and to speed up the response to the component for tilting with opposite phases.

In addition, since the auxiliary mirror 10 and the dynamically compensating balancer 11 are tilted with opposite phases, the mounting base 12 ceases to sway, so that the mounting base 12 and the reference plane (in this embodiment, the inclination of the main mirror) are always made parallel.

Hence, the reliability of the detected angles $\phi_M$ and $\phi_C$ improves, and an increase in the transition time due to the swaying of the mounting base 12 can be suppressed.

Namely, with the conventional apparatus, the component for tilting with the same phases and the component for tilting with opposite phases are controlled by using identical filters, if the control range is widened to improve control accuracy, the component for tilting with the same phases is amplified with the same amplification factor as that of the component for tilting with opposite phases. Hence, the dynamic characteristic of the conventional apparatus has been unstable.

However, in this embodiment, a stabilizing filter with a low amplification factor is used for the component for tilting with the same phases, while a stabilizing filter with a high amplification factor is used for the component for tilting with opposite phases, whereby the auxiliary mirror 10 and the dynamically compensating balancer 11 which are to be driven at high speed with high accuracy can be tilted with opposite phases. Consequently, the mounting base 12 can be made stationary with respect to the reference plane (not shown).

In addition, as the mounting base 12 ceases to sway, the angle between the dynamically compensating balancer 11 and the mounting base 12 and the angle between the dynamically compensating balancer 11 and the reference plane (not shown) can be made to conform to each other, and the lag in the transition time due to the swaying of the mounting base 12 can be overcome.

Accordingly, it is possible to suppress the swaying of the mounting base 12 which is attributable to the tilting of the auxiliary mirror 10 and the dynamically compensating balancer 11 with the same phases, without impairing the dynamic characteristic of the component in which the auxiliary mirror 10 and the dynamically compensating balancer 11, which are to be driven at high speed with high accuracy, are tilted with opposite phases. Consequently, it is possible to obtain an apparatus for controlling the driving of an auxiliary mirror which exhibits high stability and excels in the response characteristic.

The above-described control not only makes it possible to tiltably move the auxiliary mirror of a reflecting telescope at high speed, but is also applicable to an apparatus for controlling the driving of a body (corresponding to the apparatus for controlling the driving of an auxiliary mirror in this embodiment, and not shown) which is arranged as follows: In a case where an object body (corresponding to the auxiliary mirror in this embodiment) is moved at a high speed and is stopped at an accurate position as in controlling an arm in a high-speed robot, or controlling such as a stepper, i.e., an apparatus for manufacturing a semiconductor, a compensating body (corresponding to the dynamically compensating balancer in this embodiment) is supported by a support (corresponding to the mounting base in this embodiment) so as to eliminate a reaction force occurring in the support for supporting the object body due to the movement of the body, and the object body and the compensating body are made to undergo motion with opposite phases, thereby allowing the reaction force occurring in the support due to the motion of the object body and the reaction force occurring in the support due to the motion of the compensating body to offset each other, so as to prevent an unnecessary force from being imparted to the support.

Second Embodiment

Next, referring to FIGS. 3A and 3B, a description will be given of an apparatus for controlling the driving of an auxiliary mirror according to another embodiment of the invention.

Figure 3A:
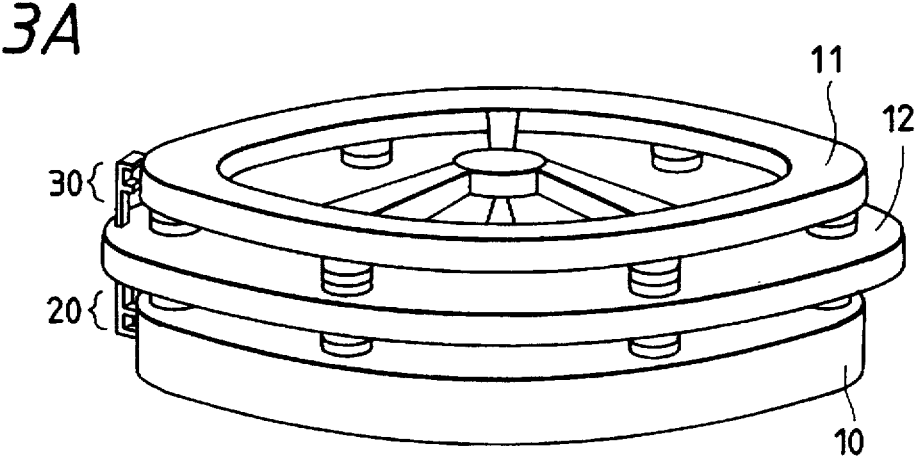
FIGS. 3A and 3B show a structure of an apparatus for controlling the driving of a body according to a second embodiment of the invention.
Figure 3B:
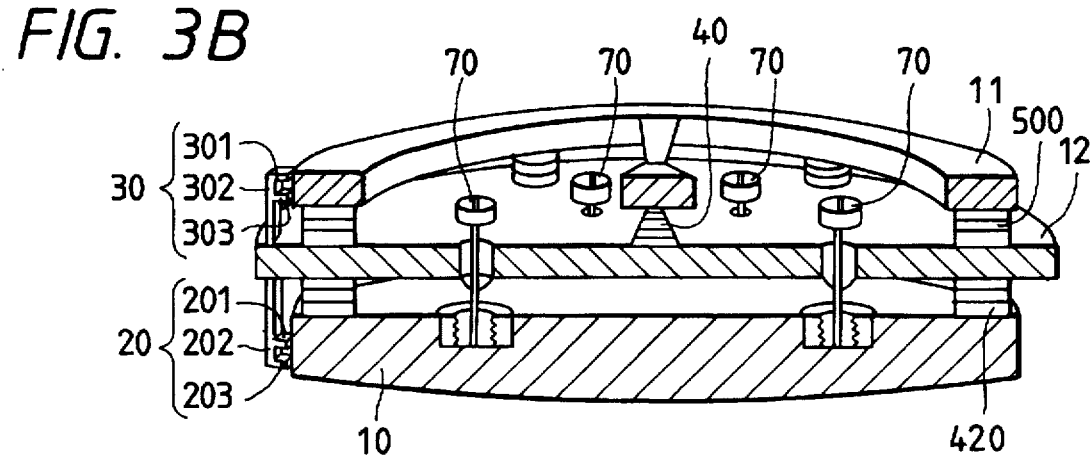

FIG. 3A shows a perspective view of an apparatus for controlling the driving of an auxiliary mirror according to this embodiment, and FIG. 3B shows a cross-sectional view thereof.

In FIGS. 3A and 3B, reference numeral 10 denotes the auxiliary mirror; 11, the dynamically compensating balancer; and 12, the mounting base. The mounting base 12 is supported by stiff supports (not shown) such as springs, and is disposed in such a manner as to be parallel with the inclination of the main mirror (not shown) which serves as a reference plane.

Reference numeral 40 denotes a pivot which receives the weight of the dynamically compensating balancer 11 itself. As the dynamically compensating balancer 11 is supported at the position of its center of gravity by means of the pivot 40, the dynamically compensating balancer 11 is capable of changing its inclination by using as its center the position of its center of gravity.

Reference numeral 20 denotes a sensor for detecting the relative displacement between the auxiliary mirror 10 and the mounting base 12. In this embodiment, as this sensor 20 a capacitive type sensor is used in which an electrode 202 fixed to the auxiliary mirror 10 is interposed between a pair of electrodes 201 and 203 which are fixed to the mounting base 12 so as to detect a change in the relative displacement between the auxiliary mirror 10 and the mounting base 12 due to the tilting of the auxiliary mirror 10 on the basis of a change in capacitance.

If at least three sensors 20 are used to measure the relative displacement between the auxiliary mirror 10 and the mounting base 12 at different points that are not located on a straight line by arranging the sensors 20 at positions that are 120 degrees symmetrical, for instance, it is possible to calculate the plane to which the auxiliary mirror 10 belongs. Thus, it is possible to calculate the relative angle between the auxiliary mirror 10 and the mounting base 12 on the basis of the calculated plane.

In addition, the relative-displacement detecting device 200 can be obtained by arranging the sensors 20 as described above (not shown).

Reference numeral 30 denotes a sensor for detecting the relative displacement between the dynamically compensating balancer 11 and the mounting base 12. In this embodiment, as this sensor 30 a capacitive type sensor is used in which an electrode 302 fixed to the dynamically compensating balancer 11 is interposed between a pair of electrodes 301 and 303 which are fixed to the mounting base 12 so as to detect a change in the relative displacement between the dynamically compensating balancer 11 and the mounting base 12 due to the tilting of the dynamically compensating balancer 11 on the basis of a change n capacitance (the state in which the sensors 30 are arranged at three points, respectively, is not shown).

If at least three sensors 30 are used to measure the relative displacement between the dynamically compensating balancer 11 and the mounting base 12 at different points that are not located on a straight line by arranging the sensors 30 at positions that are 120 degrees symmetrical, for instance, it is possible to calculate the plane to which the dynamically compensating balancer 11 belongs. Thus, it is possible to calculate the relative angle between the dynamically compensating balancer 11 and the mounting base 12 on the basis of the calculated plane (the state in which the sensors 30 are arranged at three points, respectively, is not shown).

In addition, the relative-displacement detecting device 300 can be obtained by arranging the sensors 30 as described above (not shown).

Reference numeral 420 denotes an actuator which is provided with the function of adjusting the angle between the auxiliary mirror 10 and the mounting base 12. In this embodiment, a magnetic attraction actuator for converting magnetism into torque is used as the actuator 420, and six actuators 420 are arranged between the auxiliary mirror 10 and the mounting base 12 at positions that are rotationally symmetrical.

If at least three actuators 420 are arranged at points that are not located on a straight line, the auxiliary mirror 10 can be tilted in various directions.

Accordingly, as the six actuators 420 are arranged at positions that are rotationally symmetrical, the auxiliary mirror 10 can be tilted with respect to the mounting base 12 in various directions.

Reference numeral 500 denotes an actuator which is provided with the function of adjusting the angle between the dynamically compensating balancer 11 and the mounting base 12. In this embodiment, six actuators 500 are arranged between the dynamically compensating balancer 11 and the mounting base 12 at positions that are rotationally symmetrical.

If at least three actuators 500 are arranged at points that are not located on a straight line, the dynamically compensating balancer 11 can be tilted in various directions.

Accordingly, as the six actuators 500 are arranged at positions that are rotationally symmetrical, the dynamically compensating balancer 11 can be tilted with respect to the mounting base 12 in various directions.

Reference numeral 70 denotes a supporting mechanism which is provided with the function of correcting the positional deviation of the mirror surface of the auxiliary mirror 10 and supporting the auxiliary mirror 10 on the mounting base 12. In this embodiment, the supporting mechanisms 70 are arranged at positions that are rotationally symmetrical.

Figure 4:
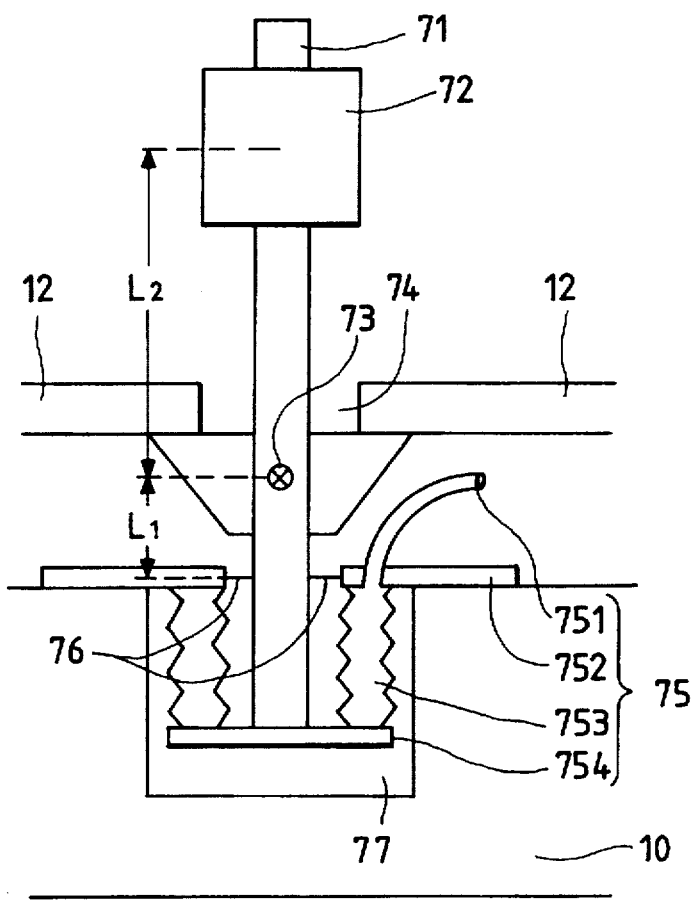
FIG. 4 shows a specific structure of a supporting mechanism used in the apparatus of FIGS. 3A and 3B.

An enlarged diagram of one of the supporting mechanisms 70 is shown in FIG. 4.

FIG. 4 illustrates the structure of the supporting mechanism 70 in the apparatus for controlling the driving of an auxiliary mirror in accordance with the present invention.

In FIG. 4, reference numeral 71 denotes a lever for supporting the load acting in a direction parallel to the mounting base 12 (or in a direction perpendicular to the optical axis of the auxiliary mirror 10), and for supporting the auxiliary mirror 10 on the mounting base 12, and numeral 73 denotes a hinge connecting the lever 71 and the mounting base 12 and capable of tilting the lever 71 in various directions.

Numeral 72 denotes a weight located above the hinge 73 and attached to the lever 71.

Numeral 75 denotes an actuator for imparting to the auxiliary mirror 10 a force which is oriented in a direction opposite to that of a component, perpendicular to the mounting base 12, of the weight of the auxiliary mirror 10 itself, and which has an equal magnitude thereto. In this embodiment, a pneumatic actuator is used as the actuator 75. The pneumatic actuator 75 is comprised of an extensible body 753 having a property of extending or contracting due to changes in the pressure of a gas, a cover 752 covering an upper portion of the extensible body 753 and secured to the auxiliary mirror 10, a cover 754 covering a lower portion of the extensible body 753, and a tube 751 communicating with a hole provided in the cover 752.

Numeral 76 denotes a diaphragm which permits displacement in the direction perpendicular to the mounting base 12, but has large rigidity with respect to displacement in the direction parallel to the mounting base 12.

Numeral 77 denotes a cavity provided in the auxiliary mirror 10, and the cavity 77 has such a depth that it does not hamper a change in the position of the cover 754 due to the extension and contraction of the extensible body 753.

Numeral 74 denotes a hole provided in the mounting base, and the hole 74 has such a size that it does not hamper the tilting of the lever 71 due to the tilting of the auxiliary mirror 10.

Next, a description will be given of a method of suppressing the positional deviation of the mirror surface of the auxiliary mirror 10 which is attributable to temporal changes of components obtained when the auxiliary mirror 10 is tilted by the supporting mechanisms 70 and the weight of the auxiliary mirror 10 itself is separated into the component parallel to the mounting base 12 and the component perpendicular to the mounting base 12.

Specifically, the auxiliary mirror 10 is segmented into a plurality of blocks, and the weight of each of the blocks themselves is further separated into the component parallel to the mounting base 12 and the component perpendicular to the mounting base 12. The component parallel to the inclination of the mounting base 12 is suppressed by using each combination of the lever 71, the weight 72, the hinge 73, and the diaphragm 76 on the basis of their basic principle, while the component perpendicular to the inclination of the mounting base 12 is suppressed by each actuator 75.

First, a description will be given of a method of suppressing the positional deviation of the mirror surface of the auxiliary mirror 10 due to the component, parallel to the mounting base 12, of the weight of the auxiliary mirror 10 itself.

As the auxiliary mirror 10 is tilted, the component, parallel to the mounting base 12, of the weight of each of the blocks themselves, which are obtained by segmenting the auxiliary mirror 10 into the plurality of blocks, is transmitted to the lever 71 by means of the cover 752 and the diaphragm 76.

Since the lever 71 is coupled to the mounting base 12 by means of the hinge 73, the lever 71 forms a lever in which the hinge 73 serves as a fulcrum.

Accordingly, if a force that would balance with the component, parallel to the mounting base 12, of the weight of the auxiliary mirror 10 itself acting on the portion of the lever 71 located below the hinge 73 on the basis of the principle of the lever is imparted to the portion of the lever 71 located above the hinge 73, it is possible to offset the component, parallel to the mounting base 12, of the weight of the auxiliary mirror 10 itself. As a result, it is possible to suppress the positional deviation due to the weight of the auxiliary mirror 10 itself.

In this embodiment, the provision of the weight 72 above the hinge 73 makes it possible to offset the component, parallel to the mounting base 12, of the weight of the auxiliary mirror 10 itself.

At this time, it is necessary to appropriately design the weight of the weight 72, the distance $L_1$ between the hinge 73 and the position where the position of the center of gravity of the weight 72 acts on the lever 71, and the distance $L_2$ between the hinge 73 and the diaphragm 76.

Next, a description will be given of a method of suppressing the positional deviation of the mirror surface of the auxiliary mirror 10 due to the component, perpendicular to the mounting base 12, of the weight of the auxiliary mirror 10 itself.

As the reflecting telescope is tilted, the component, perpendicular to the mounting base 12, of the weight of the auxiliary mirror 10 itself changes. Accordingly, the pressure of each actuator 75 is regulated so as to generate a force which is oriented in a direction opposite to that of the component perpendicular to the mounting base 12, and which has an equal magnitude thereto, at each timing.

Figure 5:
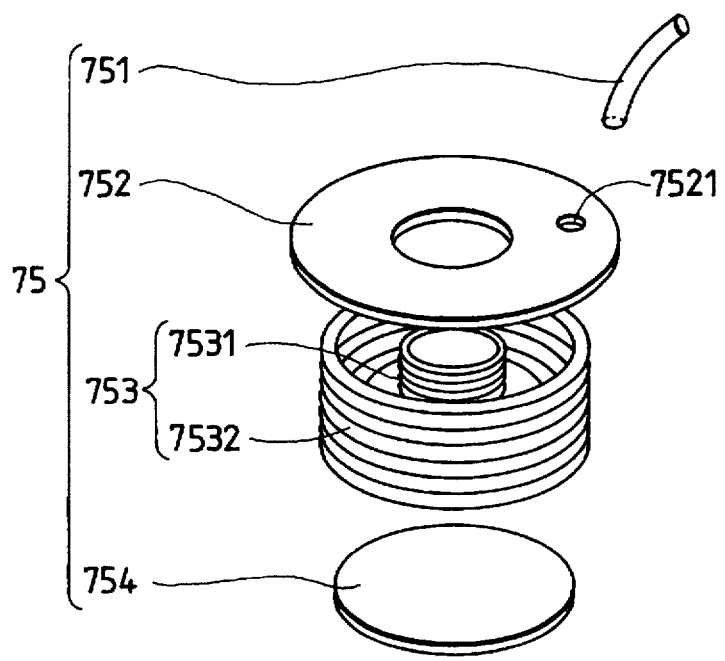
FIG. 5 shows a specific structure of a pneumatic actuator used in the supporting mechanism of FIG. 4.

An exploded view of the actuator 75 is shown in FIG. 5.

In FIG. 5, reference numeral denotes the extensible body which extends and contracts in correspondence with the pressure of a gas, and the extensible body 753 has a bellows-like outer side surface 7532 and a bellows-like inner side surface 7531.

Numeral 752 denotes the doughnut-shaped cover which covers the upper portion of the extensible body 753, and which is provided with a hole 7521 above the space between the inner side surface 7531 and the outer side surface 7532. The outside diameter of the cover 752 is greater than the outside diameter of the outer side surface 7532, and the inside diameter of the cover 752 is smaller than the inside diameter of the inner side surface 7531.

In addition, an outer peripheral portion of the cover 752 is secured to the auxiliary mirror 10.

Numeral 754 denotes the cover for covering the lower portion of the extensible body 753, and numeral 751 denotes the tube for allowing air to flow in or out. The structure provided is such that the outside diameter of the tube 751 and the inside diameter of the hole 7521 fit to each other.

As the actuator 75 is arranged as described above, air can be allowed to flow into or out of one end of the tube 751, whereby it is possible to generate a force which is oriented in the direction opposite to that of the component, perpendicular to the mounting base 12, of the weight of the auxiliary mirror 10 itself and which has an equal magnitude thereto. Hence, a reaction force, which is oriented in the direction opposite to that of the component, perpendicular to the mounting base 12, of the weight of the auxiliary mirror 10 itself and which has an equal magnitude thereto, can be calculated for each predetermined timing. If this reaction force is generated by the actuators 75, it is possible to suppress the positional deviation of the mirror surface of the auxiliary mirror 10 attributable to the weight of the auxiliary mirror 10 itself.

In addition, if the pressure is not regulated with respect to individual tubes, and the plurality of tubes are connected to each other, the internal pressure of a plurality of extensible bodies connected to each other by the tubes can be set to a fixed level. Hence, if this internal pressure is designed so as to offset the component, perpendicular to the mounting base 12, of the weight of the auxiliary mirror 10 itself, it is possible to suppress the positional deviation of the auxiliary mirror 10 attributable to the component, perpendicular to the mounting base 12, of the weight of the auxiliary mirror 10 itself (not shown).

If the angle through which the auxiliary mirror 10 is tiltably moved is very small, if the tilting motion of the auxiliary mirror 10 in the vicinity of the supporting mechanism 70 is observed, there occurs a reciprocating motion perpendicular to the reference plane (not shown).

If such a motion occurs, to suppress a positional variation of the auxiliary mirror 10 due to its own weight, the actuators 75 generate torque in the direction perpendicular to the mounting base 12 by repeating contraction and extension by very small amounts. However, since the amount of the tilting motion of the auxiliary mirror 10 is very small, the fluctuations of the torque generated by the pneumatic actuators 75 is sufficiently smaller than the torque of the tiltably driving actuators. Therefore, the fluctuations of the torque generated by the pneumatic actuators 75 do not hamper the torque of the tiltably driving actuators caused in controlling the auxiliary mirror 10.

Third Embodiment

In the second embodiment, the actuators 75 for converting a change in the pressure of the gas into torque are used as the means for suppressing the deflection of the auxiliary mirror 10 in the direction of the optical axis due to its own weight. In this case, the deflection of the auxiliary mirror 10 in the direction perpendicular to the mounting base 12 due to its own weight is suppressed by regulating the amount of air flowing into each actuators 75 in correspondence with the inclination of the auxiliary mirror 10.

The following problem is encountered when the deflection of the auxiliary mirror 10 due to its own weight is suppressed.

That is, since the response of the extensible body 753 due to the change in the pressure of the gas is slow, in the case where the auxiliary mirror 10 is tilted at high speed, the pneumatic actuators 75 are incapable of following the change. Hence, there is the possibility of the auxiliary mirror 10 vibrating in the direction perpendicular to the mounting base 12.

This embodiment is designed to overcome the above-described problem, and the oscillation frequency of the auxiliary mirror 10 at its center of gravity is determined by detecting changes in the position of the center of gravity of the auxiliary mirror 10, thereby providing control in correspondence with the oscillation frequency.

Figure 6:
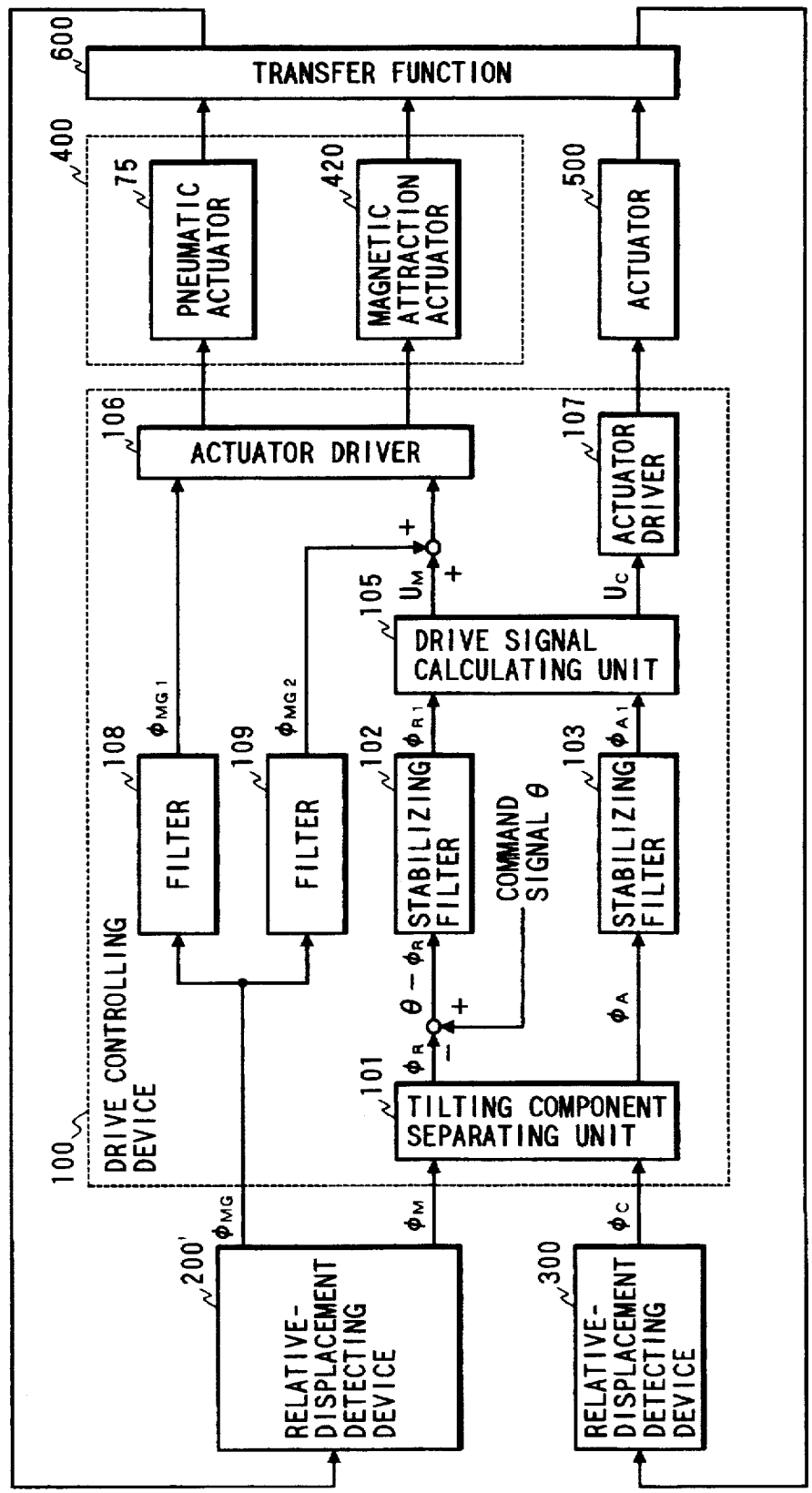
FIG. 6 is a block diagram showing an apparatus for controlling the driving of a body according to a third embodiment of the invention.

FIG. 6 is a block diagram illustrating the structure of the apparatus for controlling the driving of an auxiliary mirror according to this embodiment.

In FIG. 6, reference numeral 400 denotes an actuator having the function of adjusting the angle between the auxiliary mirror 10 and the mounting base 12 and suppressing the vibration of the auxiliary mirror 10 at its center of gravity. The actuator 400 is comprised of the pneumatic actuator 75 which converts the pressure of a gas into torque and has the function of suppressing the positional deviation of the mirror surface of the auxiliary mirror 10 due to its own weight and suppressing a low-oscillation-frequency component in the vibration of the auxiliary mirror 10 at the position of its center of gravity, as well as the magnetic attraction actuator 420 which converts magnetism into torque and has the function of adjusting a high-oscillation-frequency component in the vibration of the auxiliary mirror 10 at the position of its center of gravity, and adjusting the angle of the auxiliary mirror 10.

Reference numeral 200' denotes the relative-displacement detecting device for detecting the angle $\phi_M$ between the auxiliary mirror 10 and the mounting base 12 on the basis of relative displacement between the auxiliary mirror 10 and the mounting base 12, and the distance $\phi_{MG}$ between the mounting base 12 and the position of the center of gravity of the auxiliary mirror 10.

Reference numeral 101 denotes a tilting-component separating unit which separates output values from the relative-displacement detecting devices 200' and 300 into a component for tiltably moving the auxiliary mirror 10 and the dynamically compensating balancer 11 with the same phases and a component for tiltably moving the auxiliary mirror 10 and the dynamically compensating balancer 11 with opposite phases.

Reference numeral 108 denotes a filter which detects a frequency the vibration at which the pneumatic actuators 75 are capable of suppressing among the vibrational components at the position of the center of gravity of the auxiliary mirror 10, from $\phi_{MG}$ detected by the relative-displacement detecting device 200', and which transmits the control signal $\phi_{MG1}$ for controlling the same to the actuator driver 106.

Reference numeral 109 denotes a filter which detects a frequency the vibration at which the pneumatic actuators 75 are incapable of suppressing among the vibrational components at the position of the center of gravity of the auxiliary mirror 10, but the magnetic attraction actuators 420 are capable of suppressing, from $\phi_{MG}$ detected by the relative-displacement detecting device 200', and which transmits the sum of the control signal $\phi_{MG2}$ for controlling the same and the output $U_M$ from the drive signal calculating unit 105 to the actuator driver 106.

Numeral 600 denotes the transfer function expressing the dynamic characteristics of both of the auxiliary mirror 10 and the dynamically compensating balancer 11. In this embodiment, the transfer function 600 is expressed by such a function that the torques of the actuators 400 and 500 are used as inputs therefor, and it outputs a relative displacement between the auxiliary mirror 10 and the mounting base 12 and a relative displacement between the dynamically compensating balancer 11 and the mounting base 12.

Figure 7:
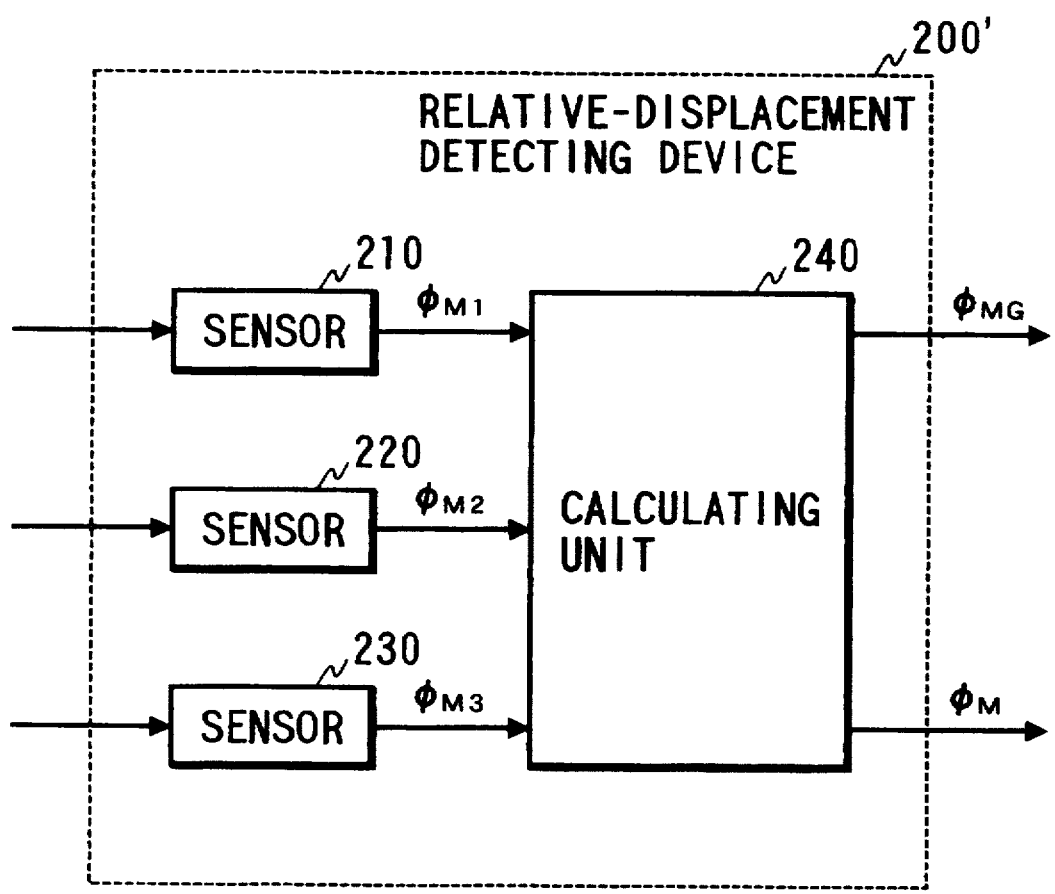
FIG. 7 shows a specific configuration of a relative-displacement detecting device used in the apparatus FIG. 6.

A specific configuration of the relative-displacement detecting device 200' is shown in FIG. 7. In FIG. 7, numerals 210, 220, and 230 denote sensors for detecting the relative distance between the auxiliary mirror 10 and the mounting base 12. The sensors 210, 220, and 230 are arranged so as not to be positioned on a straight line.

Reference numeral 240 denotes a calculating unit which calculates the plane to which the auxiliary mirror 10 belongs from output values from the sensors 210, 220, and 230, calculates the distance $\phi_{MG}$ between the mounting base 12 and the position of the center of gravity of the auxiliary mirror 10 from the calculated plane, and calculates the relative angle $\phi_M$ between the auxiliary mirror 10 and the mounting base 12 from the inclination of the calculated plane.

As the relative-displacement detecting device 200' is configured as described above, it is possible to detect the relative angle $\phi_M$ between the auxiliary mirror 10 and the mounting base 12 and the distance $\phi_{MG}$ between the mounting base 12 and the position of the center of gravity of the auxiliary mirror 10.

In the same way as the relative-displacement detecting device 200', the relative-displacement detecting device 300 is structured such that sensors 310, 320, and 330 (not shown) for detecting the relative displacement between the dynamically compensating balancer 11 and the mounting base 12 are arranged so as not to be located on a straight line, and a calculating unit 340 (not shown) is provided for calculating the plane to which the dynamically compensating balancer 11 belongs from the outputs of these sensors and for detecting the relative angle $\phi_C$ between the dynamically compensating balancer 11 and the mounting base 12 on the basis of this plane.

Next, a description will be given of the operation of the apparatus shown in FIG. 6.

First, the position of the center of gravity $\phi_{MG}$ of the auxiliary mirror 10, the relative angle $\phi_M$ between the auxiliary mirror 10 and the mounting base 12, and the relative angle $\phi_C$ between the dynamically compensating balancer 11 and the mounting base 12 are calculated by the relative-displacement detecting devices 200' and 300, and $\phi_M$ and $\phi_C$ are transmitted to the tilting-component separating unit 101.

Upon receiving $\phi_M$ and $\phi_C$, the tilting-component separating unit 101 calculates the component $\phi_A$ for tiltably moving the auxiliary mirror 10 and the dynamically compensating balancer 11 with the same phases and a component $\phi_R$ for tiltably moving the auxiliary mirror 10 and the dynamically compensating balancer 11 with opposite phases.

Next, as for the calculated $\phi_R$, the stabilizing filter 102 effects control such that the difference between $\phi^R$ and the angle θ to which the designer intends to incline the auxiliary mirror 10 with respect to the reference plane, θ–$\phi_R$, becomes 0, and its output $\phi_{R1}$ is transmitted to the drive signal calculating unit 105.

In addition, as for the calculated $\phi_A$ the stabilizing filter 103 effects control such that $\phi_A=0$, and its output $\phi_{A1}$ is transmitted to the drive-signal calculating unit 105.

The drive-signal calculating unit 105 calculates the signal $U_M$ for adjusting the angle between the auxiliary mirror 10 and the mounting base 12 and the signal $U_C$ for adjusting the angle between the dynamically compensating balancer 11 and the mounting base 12 on the basis of the values $\phi_{R1}$ and $\phi_{A1}$ transmitted thereto, $U_C$ being transmitted to the actuator driver 107.

Meanwhile, $\phi_{MG}$ calculated by the relative-displacement detecting device 200' is transmitted to the filters 108 and 109 where $\phi_{MG}$ is separated into the command signal $\phi_{MG1}$ for suppressing the vibration of the auxiliary mirror 10 at the position of its center of gravity by using the pneumatic actuators 75 and the command signal $\phi_{MG2}$ for suppressing the vibration of the auxiliary mirror 10 at the position of its center of gravity by using the magnetic attraction actuators 420, and $\phi_{MG2}$ with $U_M$ added thereto is transmitted to the actuator driver 106.

To adjust the angle between the dynamically compensating balancer 11 and the mounting base 12, the actuator driver 107 calculates torque for driving the actuators 500 on the basis of the signal $U_C$ transmitted thereto, thereby adjusting the angle between the dynamically compensating balancer 11 and the mounting base 12 by driving the actuators 500.

On the basis of the command signal $\phi_{MG1}$ and $\phi_{MG2}+U_M$ transmitted thereto, the actuator driver 106 calculates torques for driving the pneumatic actuators 75 and the magnetic attraction actuators 420. As these actuators are driven, the angle between the auxiliary mirror 10 and the mounting base 12 is adjusted, and the vibration of the auxiliary mirror 10 at the position of its center of gravity is suppressed.

Since $\phi_{MG1}$ is a signal which commands that a fixed torque be imparted to the individual pneumatic actuator 75, the signal $\phi_{MG1}$ does not change the angle between the auxiliary mirror 10 and the mounting base 12.

Since $\phi_{MG2}$ is a signal which commands that a fixed torque be imparted to the individual magnetic attraction actuator 420, the signal $\phi_{MG2}$ does not change the angle between the auxiliary mirror 10 and the mounting base 12.

The low-frequency component of the vibration frequency in the direction perpendicular to the auxiliary mirror 10 in the vibration of the auxiliary mirror 10 at the center of its gravity changes the pressure in the pneumatic actuators 75 through the filter 108.

In this case, if, in the filter 108, an upper limit of the frequency to which the pneumatic actuators 75 are capable of responding is selected at a sufficiently low level as compared to the oscillation frequency of the auxiliary mirror, fluctuations in the torque generated by the pneumatic actuators 75 can be made sufficiently small, and, therefore, do not interfere with the magnetic attraction actuators 420 to impair their action.

In addition, a change in the component, perpendicular to the auxiliary mirror 10, of the weight of the auxiliary mirror 10 itself attributable to a change in the elevation angle of the telescope causes a displacement in the auxiliary mirror 10 in the perpendicular direction.

However, since, in the filter 108, the frequency of the vibration occurring due to the displacement can be set at a lower level than the upper limit of the frequency at which response is possible, even if the pneumatic actuators 75 having small response speed are used, the pneumatic actuators 75 are capable of following the changes in frequency with sufficiently high accuracy.

Fourth Embodiment

In the third embodiment, the detection accuracy of $\phi_M$ and $\phi_C$ detected by the relative-displacement detecting devices 200' and 300 is uniform in the range of the angle of tilting.

That is, since the relative-displacement detecting devices 200' and 300 have wide detection ranges and low detection accuracy, their detection accuracy of an angle in the vicinity of the angle at which the auxiliary mirror 10 is intended by the designer to be held with respect to the reference plane (not shown) is low. Hence, it is difficult to incline and hold the auxiliary mirror 10 at the angle intended by the designer.

The present embodiment has been devised to overcome the above-described problem, and relative-displacement detecting devices are obtained which have wide detection ranges and are capable of accurately detecting an angle in the vicinity of the angle at which the auxiliary mirror 10 is intended by thedesigner to be held, thereby making it possible to incline the auxiliary mirror 10 more accurately.

Figure 8:
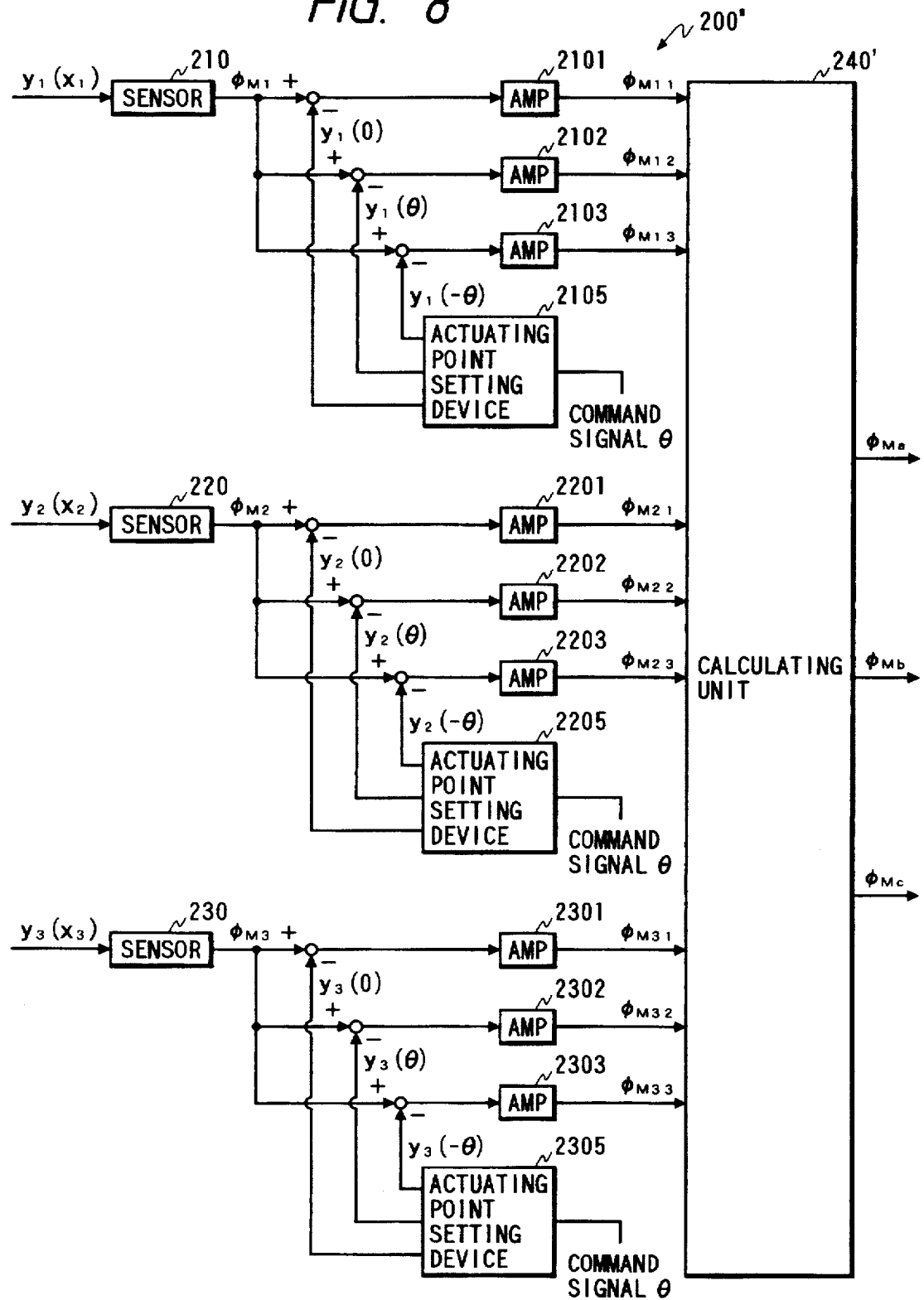
FIG. 8 shows a specific configuration of a relative-displacement detecting device according to a fourth embodiment of the invention.

FIG. 8 shows a relative-displacement detecting device according to this embodiment. In FIG. 8, reference numeral 210 denotes a sensor for detecting the distance between the auxiliary mirror 10 and the mounting base 12, and an output signal of the sensor 210 is set as $\phi_{M1}$.

Reference numeral 2105 denotes an actuating-point setting device. The angle at which the auxiliary mirror 10 is intended by the designer to be held is inputted to the actuating-point setting device 2105. Meanwhile, the actuating-point setting device 2105 outputs a theoretical value $y_1(\theta)$ to be detected by the sensor 210 when the auxiliary mirror 10 is held at the angle $\theta$ intended by the designer with respect to the reference plane (not shown), a theoretical value $y_1(-\theta)$ to be detected by the sensor 210 when the auxiliary mirror 10 is held at the angle $-\theta$ intended by the designer with respect to the reference plane (not shown), and a theoretical value $y_1(0)$ to be detected by the sensor 210 when the relative angle between the auxiliary mirror 10 and the mounting base 12 is 0.

The difference between the output value $\phi_{M1}$ from the sensor 210 and each output value outputted by the actuating-point setting device 2105 represents an amount of fluctuation of the relative displacement between the auxiliary mirror 10 and the mounting base 12 when a displacement corresponding to each output value is set as a reference.

Reference numerals 2101, 2102, and 2103 denote amplifiers. The amplification factor of the amplifier 2101 is $K_1$, the amplification factor of the amplification factors 2102 and 2103 is $K_2$, and there is a relationship $|K_1| \leq |K_2|$.

In this embodiment, the amplification factors of the amplifiers 2102 and 2103 are set to be the same value, but may be set to be different values. In this case, each of the absolute values of the amplification factors of the amplifiers 2102 and 2103 is set to be greater than the absolute value of the amplification factor of the amplifier 2101.

At this time, an output signal $\phi_{M11}$ from the amplifier 2101 is expressed by $K_1(\phi_{M1} - y_1(0))$ an output signal $\phi_{M12}$ from the amplifier 2102 is expressed by $K_2(\phi_{M1} - y_1(\theta))$, and an output signal $\phi_{M13}$ from the amplifier 2103 is expressed by $K_2(\phi_{M1} - y_1(-\theta))$.

The signals $\phi_{M11}$, $\phi_{M12}$, and $\phi_{M13}$ are transmitted to the calculating unit 240', and the angle between the auxiliary mirror 10 and the mounting base 12 is calculated by using any one of these values of $\phi_{11}$, $\phi_{12}$, and $\phi_{13}$.

Figure 9:
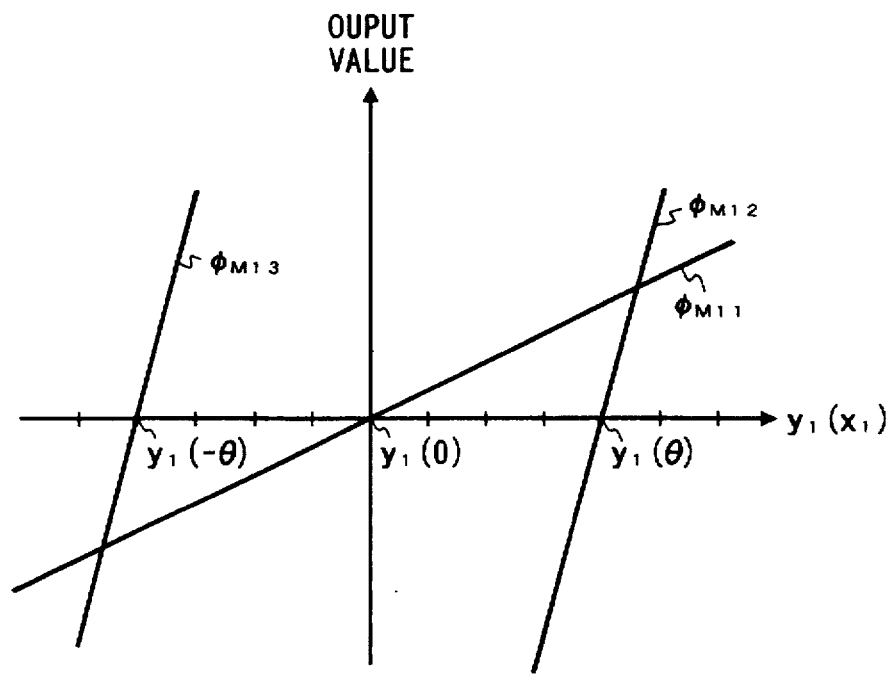
FIG. 9 shows input/output characteristics of each sensor used in the relative-displacement detecting device of FIG. 8.

FIG. 9 is a diagram illustrating characteristics of the outputs $\phi_{11}$, $\phi_{12}$, and $\phi_{13}$ with respect to $y_1(x_i)$ measured by the sensor 210.

As shown in FIG. 9, $\phi_{11}$, $\phi_{12}$, and $\phi_{13}$ are expressed as linear functions of $y_1(x_1)$, and their gradients are dependent upon the amplification factors of the amplifiers 2101, 2102, and 2103.

In addition, an upper limit and a lower limit are present in each output signal, so that a value falling outside these values cannot be fetched as an output signal. Hence, if the output signal $\phi_{11}$, $\phi_{12}$, or $\phi_{13}$ corresponding to $y_1(x_1)$ falls outside the upper limit and the lower limit, the upper limit or the lower limit is outputted (not shown).

Accordingly, by appropriately adjusting the gradients $K_1$ and $K_2$, in the output signal $\phi_{M11}$, the value of an output signal when $y_1(x_1)$ is $y_1(\theta)$ or $y_1(-\theta)$ can be made to fall within the range in which the output signal can be fetched. At the same time, the output signals which can be fetched in $\phi_{M12}$ and $\phi_{M13}$ can be made to be located in the vicinity of $y_1(\theta)$ or $y_1(-\theta)$.

Since $\phi_{M13}$ changes by a large degree in the vicinity of $y_1(x)=y_1(-\theta)$, and $\phi_{M12}$ changes by a large degree in the vicinity of $y_1(x)=y_1(\theta)$, if the angle between the auxiliary mirror 10 and the mounting base 12 is determined by using these signals, it is possible to more accurately determine the displacement at a position where $y_1(x)$ is in the vicinity of $y_1(-\theta)$ or $y_1(\theta)$.

Furthermore, if it is desirable to more accurately determine the displacement at a position where $y_1(x)$ is located outside the vicinity of $y_1(-\theta)$ or $y_1(\theta)$, the designer may cause $y_1(x_1), y_1(x_2), \ldots, y_1(x_n)$ (where n is a natural number, and $-\theta < x_1 < x_2 < \ldots < x_n < \theta$) to be outputted in addition to the aforementioned three output values by the actuating-point setting device 2105, and may cause the difference between each of these signals and $\phi_{M1}$ to be amplified by an amplifier having a higher amplification factor than the amplification factor of the amplifier 2101. By using these signals, it becomes possible to calculate the angle between the auxiliary mirror 10 and the mounting base 12 more accurately than by using $\phi_{M11}$ (not shown).

Also, since the sensors 220 and 230 are configured in a manner similar to the above-described sensor 210, a description thereof will be omitted here.

However, amplification factors of amplifiers 2201 and 2301 need to be designed in such a manner as to be equal to the amplification factor of the amplifier 2101. Similarly, amplification factors of amplifiers 2202 and 2302 need to be designed in such a manner as to be equal to the amplification factor of the amplifier 2102. Also, amplification factors of amplifiers 2203 and 2303 need to be designed in such a manner as to be equal to the amplification factor of the amplifier 2103.

Next, a description will be given of the operation of the relative-displacement detecting device shown in FIG. 8.

The signals $\phi_{11}$, $\phi_{M12}$, $\phi_{M13}$, $\phi_{M21}$, $\phi_{22}$, $\phi_{23}$, $\phi_{31}$, $\phi_{32}$, and $\phi_{33}$, are calculated on the basis of the signals outputted from the sensors 210, 220, and 230 for detecting the relative displacement between the auxiliary mirror 10 and the mounting base 12, as well as output signals from the actuating-point setting devices 2105, 2205, and 2305, and are transmitted to the calculating unit 240'.

The calculating unit 240' calculates an angle $\phi_{Ma}$ between the auxiliary mirror 10 and the mounting base 12 on the basis of $\phi_{M11}$, $\phi_{21}$, and $\phi_{31}$, an angle $\phi_{Mb}$ between the auxiliary mirror 10 and the mounting base 12 on the basis of $\phi_{M12}$, $\phi_{22}$, and $\phi_{32}$ and an angle $\phi_{Mc}$ between the auxiliary mirror 10 and the mounting base 12 on the basis of $\phi_{M13}$, $\phi_{23}$, and $\phi_{33}$, and transmits these signals to the tilting-component separating unit 101'.

The tilting-component separating unit 101' has in it a means (not shown) for calculating $\phi_R$ and $\phi_A$ on the basis of the respective signal values of $\phi_{Ma}$, $\phi_{Mb}$, and $\phi_{Mc}$, and $\phi_C$.

Figure 10:
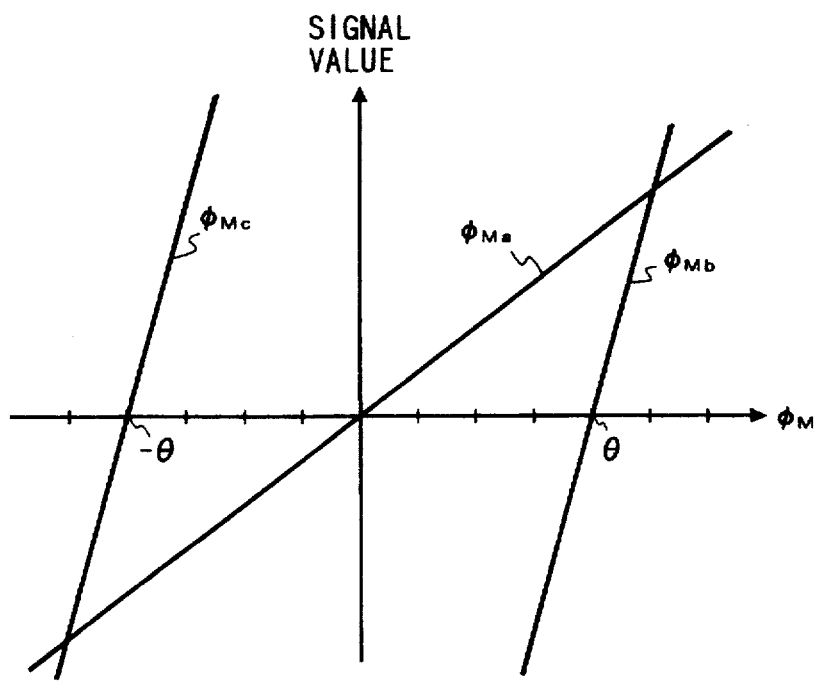
FIG. 10 shows characteristics of output signals of the relative-displacement detecting device of FIG. 8 with respect to the inclination of an auxiliary mirror.

Next, the characteristics of output values of the relative-displacement detecting device 200" are shown in FIG. 10.

FIG. 10 is a diagram illustrating the characteristics of $\phi_{Ma}$, $\phi_{Mb}$, and $\phi_{Mc}$ with respect to the angle $\phi_M$ between the auxiliary mirror 10 and the mounting base 12 in the calculating unit 240'.

If the relative-displacement detecting device 200" is configured as shown in FIG. 8, $\phi_{Ma}$, $\phi_{Mb}$, and $\phi_{Mc}$ are expressed as linear functions of $\phi_M$, and the gradients of the respective straight lines correspond to the amplification factors of the respective amplifiers.

In addition, an upper limit and a lower limit are present in the output signal, so that a value falling outside these values cannot be fetched as an output signals.

Accordingly, by appropriately adjusting the gradients $K_1$ and $K_2$, in the output signal $\phi_{Ma}$, the value of an output signal when $\phi_M=\pm\theta$ can be made to fall within the range in which the output signal can be fetched. At the same time, the output signals which can be fetched in $\phi_{Mb}$ and $\phi_{Mc}$ can be designed to be located in the vicinity of $\phi_M=\pm\theta$.

Since the output signals $\phi_{Mb}$ and $\phi_{Mc}$ change by large degrees with respect to a change of $\phi_M$ in the vicinity of $\phi_M=-\theta$ in the case of $\phi_{Mb}$, and with respect to a change of $\phi_M$ in the vicinity of $\phi_M=\theta$ in the case of $\phi_{Mc}$, if $\phi_M$ is calculated backward by using $\phi_{Mb}$ or $\phi_{Mc}$, it is possible to calculate $\phi_M$ more accurately.

In addition, as for $\phi_{Ma}$, since the value of the output signal when $\phi_M=\pm\theta$ can be made to fall within the range in which the output signal can be fetched, the arrangement makes it possible to detect the angle between the auxiliary mirror 10 and the mounting base 12 in a wide range.

In other words, at the time of outputting the relative angle with respect to the mounting base 12, the relative-displacement detecting device 200" has an output value $\phi_{Ma}$ whose detection range is wide but whose detection accuracy is low, and output values $\phi_{Mb}$ and $\phi_{Mc}$ whose detection ranges are narrow but whose detection accuracy is high.

Accordingly, since there are provided the signal $\phi_{Ma}$ making it possible to detect the angle between the auxiliary mirror 10 and the mounting base 12 in a wide range and the signals $\phi_{Mb}$ and $\phi_{Mc}$ making it possible to accurately detect a particular angle in the vicinity of the angle between the auxiliary mirror 10 and the mounting base 12, the relative-displacement detecting device 200" provides a wide detection range, and makes it possible to enhance the detection accuracy only with respect to particular angles.

As the relative-displacement detecting device 200" is thus provided with the above-described configuration, the angle between the auxiliary mirror 10 and the mounting base 12 and the angle between the dynamically compensating balancer 11 and the mounting base 12 are controlled by calculating $\phi_R$ and $\phi_A$ by using $\phi_{Ma}$ until the angle between the auxiliary mirror 10 and the mounting base 12 converges to the vicinity of $\theta$ or $-\theta$, and then if it is determined that the angle between the auxiliary mirror 10 and the mounting base 12 has converged to the vicinity of $\theta$ or $-\theta$, the angle between the auxiliary mirror 10 and the mounting base 12 and the angle between the dynamically compensating balancer 11 and the mounting base 12 are controlled by calculating $\phi_R$ and $\phi_A$ by using $\phi_{Mb}$ or $\phi_{Mc}$. By selectively using $\phi_{Ma}$, $\phi_{Mb}$, and $\phi_{Mc}$ in correspondence with the angle between the auxiliary mirror 10 and the mounting base 12 in the above-described manner, it becomes possible to calculate $\phi_R$ and $\phi_A$ more accurately, and the angle at which the auxiliary mirror 10 is to be held can be brought closer to the angle intended by the designer.

In this embodiment, a description has been given of an example in which the relative-displacement detecting device 200" for detecting the angle between the auxiliary mirror 10 and the mounting base 12 is internally provided with the amplifiers and the actuating-point setting devices, the relative-displacement detecting device 300 for detecting the displacement between the dynamically compensating balancer 11 and the mounting base 12 may also be provided with the above-described configuration. In that case, $\phi_R$ and $\phi_A$ can be calculated more accurately, and the angles at which the auxiliary mirror 10 and the dynamically compensating balancer 11 are to be held can be brought close to the angles intended by the designer.

Fifth Embodiment

IN the fourth embodiment, all the calculated $\phi_{Ma}$, $\phi_{Mb}$, and $\phi_{Mc}$ are transmitted to the tilting-component separating unit 101'. However, since the output signal of either one of $\phi_{Mb}$ and $\phi_{Mc}$ exceeds the range of values which can be fetched as an output signal, either the upper limit or the lower limit of the values which can be fetched as an output signal is outputted.

For this reason, in a case where the distance between the relative-displacement detecting device and the drive controlling device is large, the wiring or lines connecting the relative-displacement detecting device and the drive controlling device are required. However, the number of lines increases if the wiring or lines are to be provided for transmitting all the signals $\phi_{Ma}$, $\phi_{Mb}$, and $\phi_{Mc}$ to the drive controlling device.

In addition, among the signals being transmitted, the upper limit or the lower limit of the output signal is outputted. Since these signals are signals which are not essential to control, and it is not efficient to transmit these signals.

This embodiment has been devised to overcome the above-described problem, and its object is to reduce the number of wires of the wiring or lines by reducing the number of signals transmitted to the drive controlling device, thereby enhancing efficiency.

Figure 11:
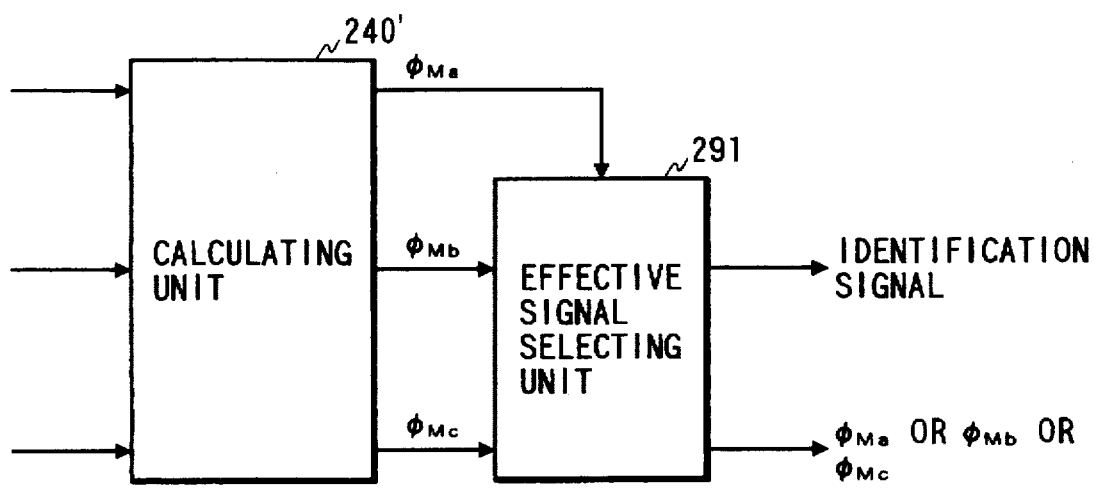
FIGS. 11 and 12 show specific configurations of relative-displacement detecting devices according to a fifth embodiment of the invention.

FIG. 11 shows the essential portion of a relative-displacement detecting device according to this embodiment.

In FIG. 11, reference numeral 291 denotes an effective-signal selecting unit. The output signals $\phi_{Ma}$, $\phi_{Mb}$, and $\phi_{Mc}$ of the calculating device are inputted to the effective-signal selecting unit 291. In a case where a value between a lower limit and an upper limit of the output signal is being outputted as either one of $\phi_{Mb}$ and $\phi_{Mc}$, the effective-signal selecting unit 291 outputs the output value of that signal and a signal for recognizing which of $\phi_{Mb}$ or $\phi_{Mc}$ that signal is. In a case where a value falling outside the lower limit or the upper limit of the output signal is being outputted as both $\phi_{Mb}$ and $\phi^{Mc}$, the effective-signal selecting unit 291 outputs $\phi^{Ma}$ and a signal for recognizing that the outputted signal is $\phi_{Ma}$. In this manner, the effective-signal selecting unit 291 outputs a selected signal in which an appropriate signal required for control with respect to the present inclination of the auxiliary mirror 10 has been selected from $\phi_{Ma}$, $\phi_{Mb}$, and $\phi_{Mc}$, as well as a recognition signal for recognizing which one of $\phi_{Ma}$, $\phi_{Mb}$, and $\phi$ the value of the selected signal is.

Next, a description will be given of the operation of the device shown in FIG. 11.

First, in the relative-displacement detecting device, $\phi_{Ma}$, $\phi_{Mb}$, and $\phi_{Mc}$ calculated by the calculating unit 240' are sent to the effective-signal selecting unit 291.

The effective-signal selecting unit 291 selects from among $\phi_{Ma}$, $\phi_{Mb}$, and $\phi_{Mc}$ one appropriate signal required for control with respect to the present inclination of the auxiliary mirror 10, and outputs its signal value.

At the same time, the effective-signal selecting unit 291 outputs the recognition signal for recognizing which one of $\phi_{Ma}$, $\phi_{Mb}$, and $\phi_{Mc}$ the value of the selected signal is.

Upon receiving these output signals, on the basis of the recognition signal the tilting-component separating unit 101' recognizes which one of $\phi_{Ma}$, $\phi_{Mb}$, and $\phi_{Mc}$ the signal value is, and control is then effected on the basis of this signal (not shown).

As the above-described configuration is provided, the effective-signal selecting unit 291 is capable of outputting an effective signal from among $\phi_{Ma}$, $\phi_{Mb}$, and $\phi_{Mc}$.

Accordingly, the number of signals to be transmitted to the drive controlling device can be reduced, and the number of wires of the wiring or lines for transmitting these signals can be reduced, thereby enhancing efficiency.

Figure 12:
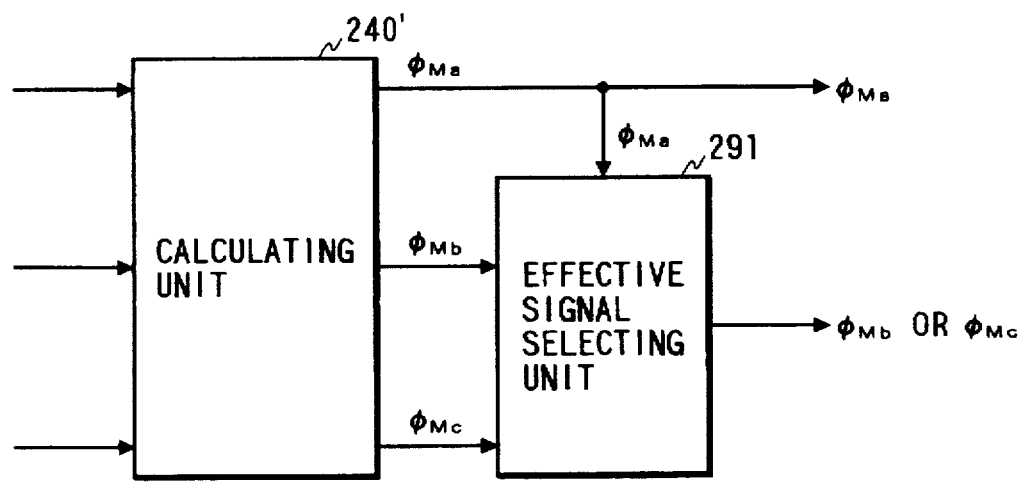
Figure 13A:
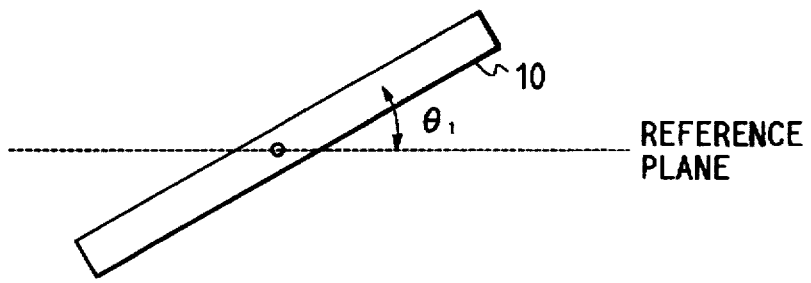
FIGS. 13A and 13B illustrate an auxiliary mirror having different angles.
Figure 13B:
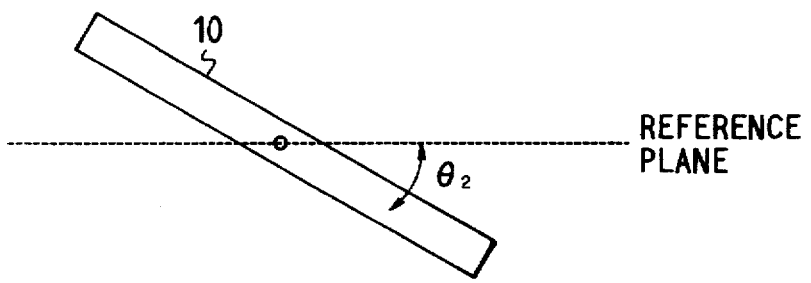
Figure 14:
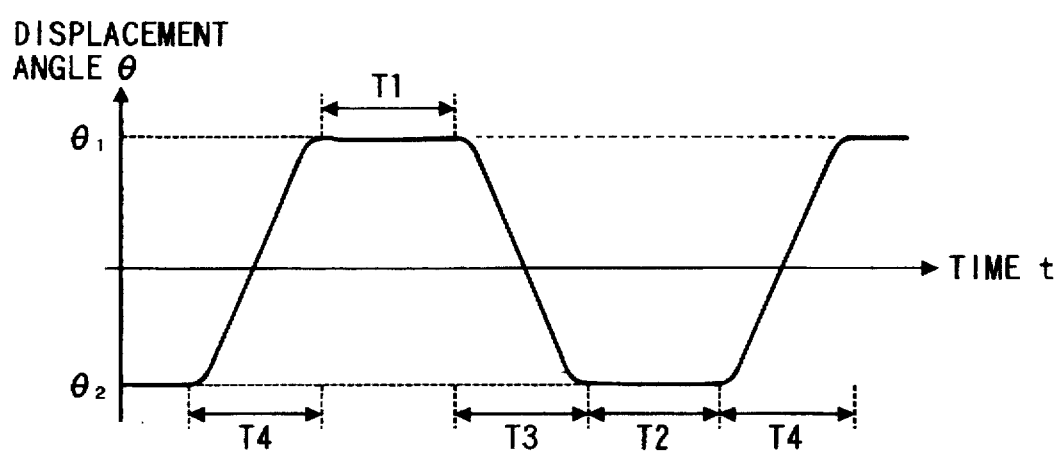
FIG. 14 shows a variation over time of the inclination of the auxiliary mirror in a spatial chopping method.
Figure 15:
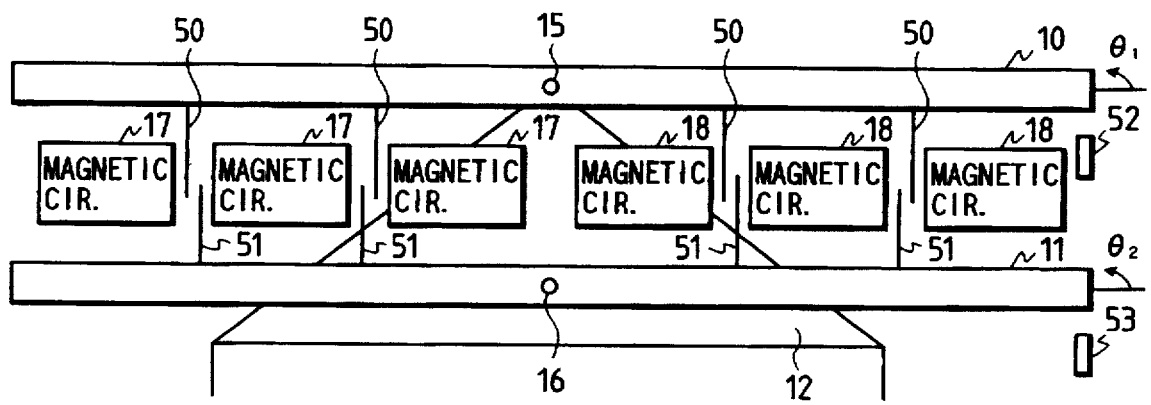
FIG. 15 shows a structure of a conventional apparatus for controlling the driving of an auxiliary mirror.
Figure 18:
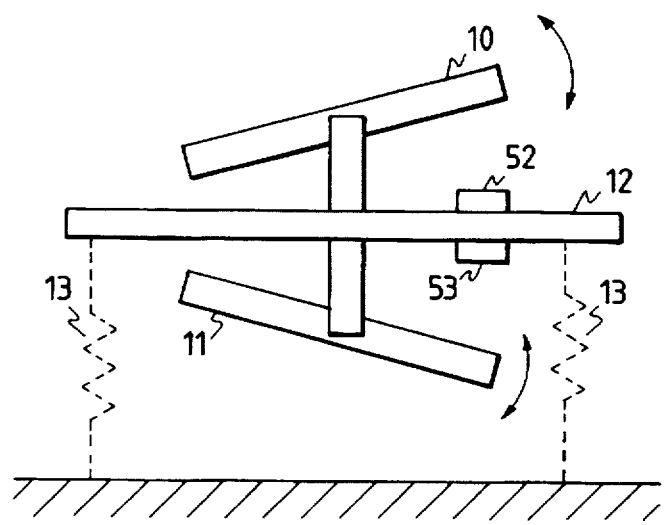
FIG. 18 illustrates a phenomenon in which a mounting base sways in the conventional apparatus of FIG. 15.
Figure 16:
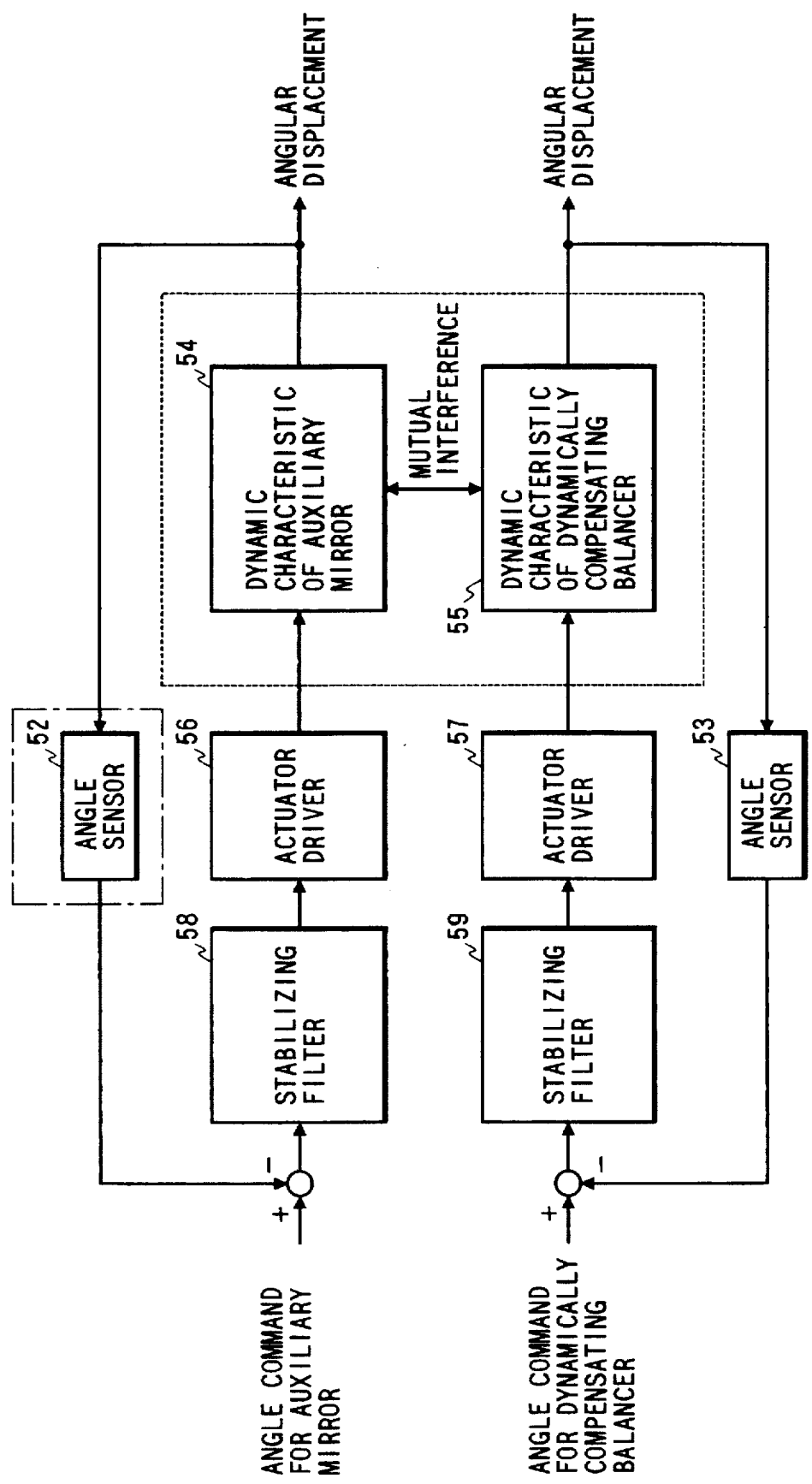
FIG. 16 is a block diagram showing a configuration of the conventional apparatus of FIG. 15.
Figure 17A:
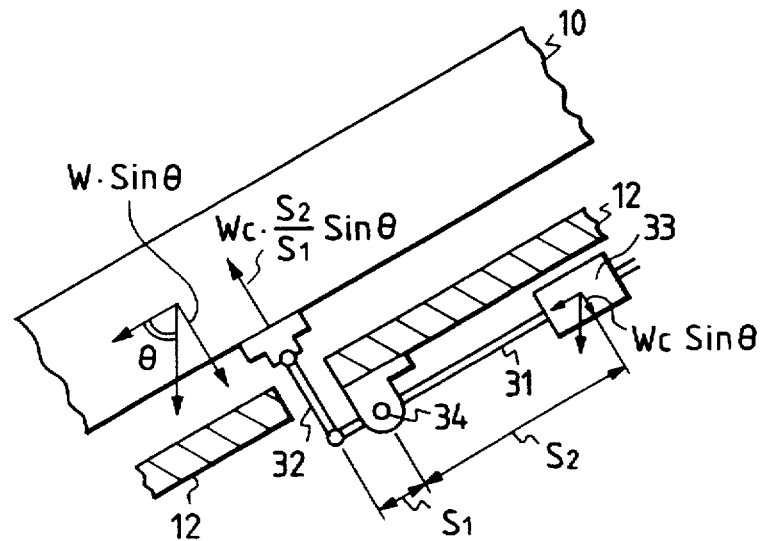
FIGS. 17A and 17B illustrate a mechanism for suppressing a positional deviation due to the weight of the auxiliary mirror itself in the conventional apparatus of FIG. 15.
Figure 17B:
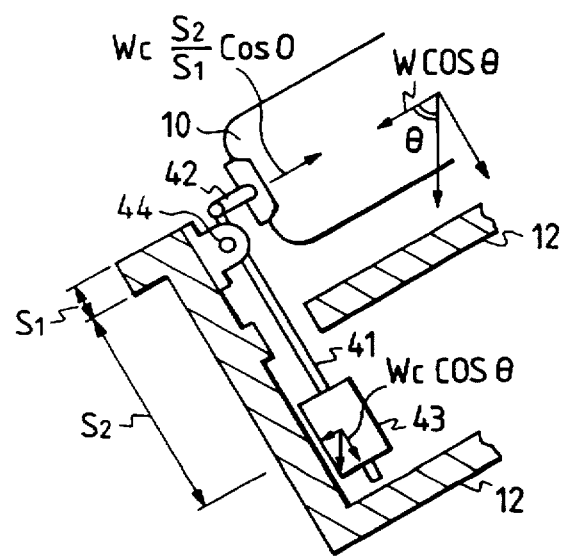

In addition, it is not essential for the effective-signal selecting unit 291 to output the identification signal. A similar effect is obtained if an arrangement is adopted as shown in FIG. 12, wherein the output signal $\phi_{Ma}$ from the calculating unit 240' is transmitted to the effective-signal selecting unit 291 and the tilting-component separating unit 101' (not shown), and the effective-signal selecting unit 291 converts $\phi_{Ma}$ into an identification signal and determines a selected signal on the basis of the identification signal, while the tilting-component separating unit 101' (not shown) calculates $\phi_R$ and $\phi_A$ on the basis of $\phi^{Ma}$ sent thereto from the calculating unit 240' and used as an identification signal and the selected signal outputted from the effective-signal selecting unit 291.

In addition, if an effective-signal selecting unit, which receives as its inputs the output signals $\phi_{M11}$, $\phi_{M12}$, $\phi_{M13}$ from the amplifiers and selects and outputs one signal required for controlling the angle of the auxiliary mirror 10 among the output signals $\phi_{M11}$, $\phi_{M12}$, and $\phi_{M13}$, is interposed between the amplifiers 2101, 2102, and 2103 on the one hand, and the calculating unit 240' on the other, it becomes possible to reduce the wiring or the number of lines between the amplifiers and the calculating unit.

What is claimed is:

1. An apparatus for controlling the driving of a body, comprising:
    a first body that undergoes motion about a center of gravity thereof;
    a second body that undergoes motion about a center of gravity thereof;
    a support for supporting said first and second bodies, wherein said first and second bodies are positioned on opposite sides of said support so that said support is sandwiched between said first and second bodies, wherein the center of gravity of said first and second body lie in a same plane being perpendicular to the plane of said support;
    a first detecting device for detecting a first relative displacement between the support and the first body;
    a first actuator for adjusting the first displacement;
    a second detecting device for detecting a second relative displacement between said support and said second body;
    a second actuator for adjusting the second displacement; and
    a drive controlling device for separating, based on the first displacement and the second displacement, motion of said first and second bodies into a component in which said first and second bodies move with a same phase and a component in which said first and second bodies move with opposite phases, and for controlling said first and second actuators so that the same-phase component and the opposite-phase component satisfy a predetermined relationship, so as to allow said first and second bodies to move with opposite phases,
    wherein said drive controlling device includes a supporting mechanism which operates by supporting the weight of said first body and imparting a force oriented in a direction opposite to that of the phase component and equal to the weight of said first body.

2. The apparatus according to claim 1, wherein an output signal of at least one of said first and second detecting device includes a first detection value in which a detection angle range is wide and detection accuracy is low and a second detection value in which the detection angle range is narrow and detection accuracy is high, wherein said first and second detection values are calculated before an A/D conversion into said output signal.

3. The apparatus according to claim 1, wherein at least one of said first and second detecting device outputs a first detected value in which a detection angle range is wide and a detection accuracy is low and outputs a second detection value in which a detection angle range is narrow and a detection accuracy is high, and outputs an identification signal indicating the output is one of said first detection value and said second detection value, wherein said first and second detection values are added before an A/D conversion.

4. An apparatus according to claim 1, wherein said drive controlling device includes a first stabilizing filter having a low amplification factor used for the same-phase component and a second stabilizing filter having a high amplification factor used for the opposite-phase component.

5. An apparatus according to claim 1, further comprising a pivot for supporting the weight of said second body at the center of gravity thereof, placed between said second body and said support at a center position of said support.

6. An apparatus according to claim 1, further comprising at least one capacitive type sensor, wherein said at least one capacitive type sensor includes a single electrode fixed to said first body and interposed between a pair of electrodes fixed to said support, for detecting a change in the relative displacement between said first body and said support on the basis of a change in capacitance.

7. An apparatus according to claim 6, wherein said at least one capacitive type sensor includes three capacitive type sensors which are arranged at positions which are 120 degrees symmetrical, for determining the plane of said first body.

8. An apparatus according to claim 1, wherein said supporting mechanism of said drive controlling device includes a plurality of said supporting mechanism arranged in a rotationally symmetrical formation, wherein each of said supporting mechanisms comprise:
    a lever fixed to said first body and said support for supporting a load acting in a direction parallel to said support and for supporting said first body on said support;

a weight attached to an end of said lever which is opposite from another end of said lever attached to said first body; and a hinge located on said lever and below said weight, wherein said supporting mechanism corrects the positional deviation of said first body and is attached to said first actuator.

9. An apparatus for controlling the driving of a body, comprising:

an auxiliary mirror of a reflecting telescope that undergoes motion about a center of gravity thereof;

a dynamically compensating balancer of the reflecting telescope that undergoes motion about a center of gravity thereof;

a mounting base for supporting said auxiliary mirror and said dynamically compensating balancer;

a first detecting device for detecting a first relative displacement between said mounting base and said auxiliary mirror;

a first actuator for adjusting the first displacement;

a second detecting device for detecting a second relative displacement between said mounting base and said dynamically compensating balancer;

a second actuator for adjusting the second displacement; and a drive controlling device for separating, based on the first displacement and the second displacement, motion of said auxiliary mirror and said dynamically compensating balancer into a component in which said auxiliary mirror and said dynamically compensating balancer move with a same phase and a component in which said auxiliary mirror and said dynamically compensating balancer move with opposite phases, and for controlling the first and second actuators so that the same-phase component and the opposite-phase component satisfy a predetermined relationship, so as to allow said auxiliary mirror and said dynamically compensating balancer to move with opposite phases.

10. The apparatus according to claim 9, wherein the first detecting device detects a relative angle between the mounting base and the auxiliary mirror.

11. The apparatus according to claim 10, wherein the first detecting device has at least three sensors arranged so as not to be located on a straight line, each for detecting a relative distance between the mounting base and the auxiliary mirror, said sensors determine a plane to which the auxiliary mirror belongs based on the detected relative distances, and said sensors detect the relative angle between the mounting base and the auxiliary mirror based on the determined plane.

12. The apparatus according to claim 9, wherein the second detecting device detects a relative angle between the mounting base and the dynamically compensating balancer.

13. The apparatus according to claim 12, wherein the second detecting device has at least three sensors arranged so as not to be located on a straight line, each for detecting a relative distance between the mounting base and the dynamically compensating balancer, said sensors determine a plane to which the dynamically compensating balancer belongs based on the detected relative distances, and said sensors detect the relative angle between the mounting base and the dynamically compensating balancer based on the determined plane.

14. The apparatus according to claim 9, further comprising a supporting mechanism which includes first supporting means for supporting the auxiliary mirror so as to cancel a first component of its own weight which is parallel with the auxiliary mirror, and second supporting means for supporting the auxiliary mirror so as to cancel a second component of the weight which is perpendicular to the auxiliary mirror, whereby a positional deviation of the auxiliary mirror due to its own weight is suppressed.

15. The apparatus according to claim 14, wherein the second supporting means is a pneumatic actuator for supporting the auxiliary mirror by using pressure of a gas.

* * * * *